US006763048B2

(12) United States Patent
Govorkov et al.

(10) Patent No.: US 6,763,048 B2
(45) Date of Patent: Jul. 13, 2004

(54) LINE NARROWING OF MOLECULAR FLUORINE LASER EMISSION

(75) Inventors: Sergei Govorkov, Boca Raton, FL (US); Klaus Vogler, Goettingen (DE); Rainer Paetzel, Dransfeld (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 09/883,128

(22) Filed: Jun. 15, 2001

(65) Prior Publication Data

US 2002/0006148 A1 Jan. 17, 2002

Related U.S. Application Data

(60) Provisional application No. 60/212,301, filed on Jun. 19, 2000, and provisional application No. 60/297,199, filed on Jun. 7, 2001.

(51) Int. Cl.$^7$ .............................. H01S 3/00; H01S 3/22; H01S 3/223
(52) U.S. Cl. ........................ 372/57; 372/58; 372/38.02; 372/38.04
(58) Field of Search ......................... 372/57, 58, 38.02, 372/38.04

(56) References Cited

U.S. PATENT DOCUMENTS

| | | | | |
|---|---|---|---|---|
| 4,613,971 A | * | 9/1986 | Brumme et al. ............... 372/87 |
| 5,095,492 A | | 3/1992 | Sandstrom ................... 372/102 |
| 5,150,370 A | * | 9/1992 | Furuya et al. ............... 372/160 |
| 5,642,374 A | * | 6/1997 | Wakabayashi et al. ........ 372/57 |
| 5,852,627 A | | 12/1998 | Ershov ........................ 372/108 |
| 5,856,991 A | | 1/1999 | Ershov ........................ 372/57 |
| 5,898,725 A | | 4/1999 | Fomenkov et al. .......... 372/102 |
| 6,101,211 A | | 8/2000 | Wakabayashi et al. ...... 372/102 |
| 6,154,470 A | | 11/2000 | Basting et al. ................ 372/19 |
| 6,381,256 B1 | * | 4/2002 | Stamm et al. ................ 372/19 |
| 6,522,681 B1 | | 2/2003 | Kleinschmidt ............... 372/108 |
| 6,526,086 B1 | | 2/2003 | Wakabayashi et al. ........ 372/69 |
| 6,556,613 B2 | | 4/2003 | Kleinschmidt et al. ..... 372/103 |
| 6,577,663 B2 | | 6/2003 | Vogler ......................... 372/57 |
| 6,577,665 B2 | | 6/2003 | Vogler et al. ................. 372/58 |
| 6,590,922 B2 | | 7/2003 | Onkels et al. ................ 372/57 |
| 6,603,788 B1 | | 8/2003 | Vogler et al. ................. 372/57 |
| 6,603,789 B1 | | 8/2003 | Kleinschmidt ............... 372/57 |
| 2001/0014110 A1 | | 8/2001 | Partlo et al. ................ 372/100 |
| 2002/0006147 A1 | | 1/2002 | Cybulski et al. ............. 372/55 |
| 2002/0018506 A1 | | 2/2002 | Vogler ......................... 372/55 |
| 2002/0057723 A1 | | 5/2002 | Kleinschmidt ............... 372/57 |

FOREIGN PATENT DOCUMENTS

| | | | |
|---|---|---|---|
| WO | WO 01/29939 A1 | 4/2001 | ............ H01S/3/03 |
| WO | WO 01/59889 A1 | 8/2001 | ............ H01S/3/08 |
| WO | WO 02/099938 A1 | 12/2002 | ............ H01S/3/10 |

OTHER PUBLICATIONS

In re Provisional Patent Application No. 60/170,919, filed Dec. 15, 1999, by Jurgen Kleinschmidt et al., entitiled "Line Selection Using a Grism Output Coupler," 16 pages in length.

In re U.S. patent application Ser. No. 10/141,625, filed May 7, 2002, by Kay Zimmermann et al., entitled "Line–Narrowing Optics Module Having Improved Mechanical Performance," 56 pages in length.

In re Provisional Patent Application No. 60/126,435, filed Aug. 18, 1998, by Frank Voss et al., entitled "F2–Laser Resonator with Intracavity Line Selection," 23 pages in length.

* cited by examiner

Primary Examiner—Jerome Jackson
Assistant Examiner—Joseph Nguyen
(74) Attorney, Agent, or Firm—Stallman & Pollock LLP

(57) ABSTRACT

A molecular fluorine laser system includes a discharge tube filled with a gas mixture including molecular fluorine and at least one buffer gas and having a total pressure of less than substantially 2500 mbar, multiple electrodes within the discharge tube, a pulsed discharge circuit connected to the electrodes for energizing the gas mixture, a line-selection optic for selecting one of multiple closely-spaced lines around 157 nm emitted from the discharge tube, and a laser resonator including the line-selection optic and the discharge tube for generating a beam of laser pulses having a wavelength around 157 nm at a bandwidth of less than 0.6 pm.

42 Claims, 8 Drawing Sheets

| Pressure of F$_2$ | Total pressure (balance is He) | | | |
|---|---|---|---|---|
| 5%F$_2$ in Ne \\ He | 1500 mbar | 2500 mbar | 3000 mbar | 4000 mbar |
| 20 mbar | Laser intensity too week | 7.4 | 8.1 | 9 |
| 50 mbar | 6.8 | 8.3 | 9.4 | 9.9 |
| 80 mbar | 7 | 8 | 8.6 | 9.3 |
| 100 mbar | 6.7 | 8.1 | 8.9 | 9.7 |

| Gas mixtures: F$_2$ / Ne / He | Linewidth, averaged from several measurements (in pixel) |
|---|---|
| 4/76/3020 (standard gas), total=3100 | 8.9 |
| 4/176/3020, total=3200 | 9 |
| 4/276/3020, total=3300 | 9.1 |
| 4/376/3020, total=3400 | 10 |
| 4/1476/1560, total=3040 | 8.9 |
| 2/188/1510, total=1700 | 7.9 |
| 2/438/1560, total=2000 | 8.2 |
| 2/1438/1560, total=3000 | 9.0 |

| Reference | FWHM (pm) | E(95%) (pm) | Measurement |
|---|---|---|---|
| Can. J. Phys 63, 214, (1985) | 2...3...5 | | Eagle 10m spectrograph, Canada |
| Sov. J. Quant. Electron. 16, 707, (1986) | 10...20 | | very rough, PM - measurement |
| J. Appl. Phys. 73, 5274, (1993) | <1 (~0.8) | | Etalon: FSR=5pm |
| Appl. Phys. B51, 137, (1990) | 0.25...0.75 | | theory estimation from NO-absorption profile |
| Vogler, et al., NIST Gaithersburg 2/2000 | 0.83...0.59 | | 10.7m spectrograph at NIST, 3 order |
| Govorkov, et al., Ft. Lauderdale 3/2000 | 0.7...0.6 | | Etalon: F>7, FSR=2pm. |
| Sematech, Austin, 5/13-14/99 | 10 | | low resolution spectrograph |
| Sematech, Waltham 11/17-19/99 | 1 | 2.48 | graph in paper |
| SPIE Microlithography, Santa Clara, Feb. 2000 | 1.08...0.72 | 2.5 | 1m Czerny Turner spectrograph |
| Sematech, Dana Point, 5/8-11/00 | 0.68 | | new double Echelle-spectrograph |
| Sematech, Austin, 5/13-14/99 | 1.14 | 2.35 | high resolution Cymer spectrograph |
| Sematech, Waltham, 11/17-19/99 | 1.14 | 2.35 | high resolution Cymer spectrograph |
| SPIE Microlithography, Santa Clara, Feb. 2000 | 1...0.77 | | high resolution Cymer spectrograph |
| Sematech, Phoenix, 2/13-16/99 | 1.49 | | 2.5m home built spectrograph |
| Sematech, Austin, 5/13-14/99 | 1.07 | 2.3 | 2.5m home built spectrograph |
| Sematech, Waltham, 11/17-19/99 | 1.17 | | 2.5m home built spectrograph |
| SPIE Microlithography, Santa Clara, Feb. 2000 | - | - | 2.5m home built spectrograph |

Fig. 11

LINE NARROWING OF MOLECULAR FLUORINE LASER EMISSION

PRIORITY

This application claims the benefit of priority to U.S. provisional patent applications No. 60/212,301, filed Jun. 19, 2000, and Ser. No. 60/297,199, filed Jun. 7, 2001.

BACKGROUND OF THE INVENTION

1. Field of the Invention

The present invention relates to a method for adjusting the bandwidth of a natural or line-narrowed emission line of a $F_2$ laser (e.g., $\lambda_1$=157.63094 nm) by adjusting the gas mixture to a selected composition.

2. Discussion of the Related Art

Line-narrowing is an important feature of excimer laser systems being used for optical lithography. Commonly the bandwidth of the natural emission of the DUV or VUV laser being used is too broad to be used with projection illumination systems. A very small bandwidth is especially valuable when using high numerical aperture (NA) refractive imaging systems, wherein bandwidths below 1 pm are desired when the NA of the projection lens is very high, such as 70 or more. Line-narrowing of natural emission lines of excimer lasers is usually done by sophisticated dispersive arrangements within the laser resonator. For example, line-narrowing of the natural emission of the ArF laser is shown in U.S. Pat. No. 5,901,163 as being performed by a prism beam expander-grating rear optics line-narrowing module in combination with an etalon outcoupler, and U.S. Pat. Nos. 6,154,470, 5,150,370, 5,596,596, 5,642,374, 5,559,816, and 5,852,627, and EP 0 472 727 B1, which are hereby incorporated by reference into the present application in this discussion and in the discussion of the preferred embodiment as disclosing variations of features of the preferred embodiment. All of these optical elements are expensive and suffer more or less from degradation due to exposure to the high intensity, intra-resonator UV emission of the laser. It is desired to have a narrow band laser, particularly for DUV and/or VUV microlithography, that has a natural bandwidth that is less than 0.6 pm, i.e., without additional intra-resonator line-narrowing optics, and/or has a bandwidth that is adjustable in a range from around 1 pm to 0.5 pm or less without having to adjust any intra-resonator line-narrowing elements.

One laser that is coming into high prominence for microlithography purposes is the molecular fluorine ($F_2$) laser emitting around 157 nm. The value of the natural bandwidth of the $F_2$ laser to be used, as well as the feasibility and limits of adjusting the bandwidth, are considerations for optical imaging system designs for 157 nm wafer illumination. It is desired, then, to have an $F_2$ laser system that is capable of emitting at bandwidths that meet the specifications of these optical systems.

RECOGNIZED IN THE PRESENT INVENTION

It is recognized in the present invention that for bandwidths from 0.6 to 1.0 pm, catadioptic projection systems are used. For bandwidths less than around 0.5 to 0.6 pm, a second material may be used (e.g., $BaF_2$ along with $CaF_2$) for dichroic correction. For line widths less than, e.g., around 0.2 pm, an optical design based only on one optical material may be used. Currently, $CaF_2$ is the most available of these materials in high quality and volume. In addition, the smaller the natural bandwidth of the laser, the easier it is to provide additional line-narrowing optics to meet the specifications of particular optical systems.

It is recognized herein that the natural bandwidth of the molecular fluorine $F_2$ laser main emission line at $\lambda_1$ is around 0.6+/−0.1 pm using a gas mixture of approximately $F_2$ (5% in Ne):He (buffer)=70 mbar:2730 mbar. It is further recognized herein that the bandwidth depends on the definite gas mixture which is used as the laser active medium for producing the $F_2$ laser emission. Especially, a remarkable dependence of the natural bandwidth on the total pressure within the laser tube, or d(BW)/dP.

SUMMARY OF THE INVENTION

In view of the above, a molecular fluorine laser system is provided including a discharge tube filled with a gas mixture including molecular fluorine and at least one buffer gas and having a total pressure of less than substantially 2500 mbar, multiple electrodes within the discharge tube, a pulsed discharge circuit connected to the electrodes for energizing the gas mixture, a line-selection optic for selecting one of multiple closely-spaced lines around 157 nm emitted from the discharge tube, and a laser resonator including the line-selection optic and the discharge tube for generating a beam of laser pulses having a wavelength around 157 nm at a bandwidth of less than 0.6 pm.

A molecular fluorine laser system is further provided including a discharge tube filled with a gas mixture including molecular fluorine and at least one buffer gas and having a total pressure of less than 2000 mbar, multiple electrodes within the discharge tube and connected to a pulsed discharge circuit for energizing the gas mixture, a line-selection optic for selecting one of multiple closely-spaced lines around 157 nm emitted from the discharge tube, and a laser resonator including the line-selection optic and the discharge tube for generating a laser beam having a wavelength around 157 nm at a bandwidth of less than 0.6 pm.

A molecular fluorine laser system is also provided including a discharge tube filled with a gas mixture including molecular fluorine and at least one buffer gas and having a total pressure of less than substantially 1500 mbar, multiple electrodes within the discharge tube and connected to a pulsed discharge circuit for energizing the gas mixture, a line-selection optic for selecting one of multiple closely-spaced lines around 157 nm emitted from the discharge tube, and a laser resonator including the line-selection optic and the discharge tube for generating a laser beam having a wavelength around 157 nm at a bandwidth of less than 0.6 pm.

A molecular fluorine laser system is further provided including a discharge tube filled with a gas mixture including molecular fluorine and at least one buffer gas and having a total pressure of less than substantially 1000 mbar, multiple electrodes within the discharge tube and connected to a pulsed discharge circuit for energizing the gas mixture, a line-selection optic for selecting one of multiple closely-spaced lines around 157 nm emitted from the discharge tube, and a laser resonator including the line-selection optic and the discharge tube for generating a laser beam having a wavelength around 157 nm at a bandwidth of less than 0.6 pm.

A molecular fluorine laser system is also provided including a discharge tube filled with a gas mixture including molecular fluorine and at least one buffer gas and having a total pressure of less than substantially 2500 mbar, multiple electrodes within the discharge tube and connected to a pulsed discharge circuit for energizing the gas mixture, a line-narrowing module for selecting one of multiple closely-spaced lines around 157 nm emitted from the discharge tube, and for optically narrowing the bandwidth of the selected line, and a laser resonator including the line-narrowing module and the discharge tube for generating a beam of laser pulses having a wavelength around 157 nm at a bandwidth of less than 0.5 pm.

A molecular fluorine laser system is further provided including a discharge tube filled with a gas mixture including molecular fluorine and at least one buffer gas and having a total pressure of less than 2000 mbar, multiple electrodes within the discharge tube and connected to a pulsed discharge circuit for energizing the gas mixture, a line-narrowing module for selecting one of multiple closely-spaced lines around 157 nm emitted from the discharge tube, and for optically narrowing the bandwidth of the selected line, and a laser resonator including the line-narrowing module and the discharge tube for generating a beam of laser pulses having a wavelength around 157 nm at a bandwidth of less than 0.5 pm.

A molecular fluorine laser system is also provided including a discharge tube filled with a gas mixture including molecular fluorine and at least one buffer gas and having a total pressure of less than substantially 1500 mbar, multiple electrodes within the discharge tube and connected to a pulsed discharge circuit for energizing the gas mixture, a line-narrowing module for selecting one of multiple closely-spaced lines around 157 nm emitted from the discharge tube, and for optically narrowing the bandwidth of the selected line, and a laser resonator including the line-narrowing module and the discharge tube for generating a beam of laser pulses having a wavelength around 157 nm at a bandwidth of less than 0.5 pm.

A molecular fluorine laser system is further provided including a discharge tube filled with a gas mixture including molecular fluorine and at least one buffer gas and having a total pressure of less than substantially 1000 mbar, multiple electrodes within the discharge tube and connected to a pulsed discharge circuit for energizing the gas mixture, a line-narrowing module for selecting one of multiple closely-spaced lines around 157 nm emitted from the discharge tube, and for optically narrowing the bandwidth of the selected line, and a laser resonator including the line-narrowing module and the discharge tube for generating a beam of laser pulses having a wavelength around 157 nm at a bandwidth of less than 0.5 pm.

A molecular fluorine laser system is also provided including a discharge tube filled with a gas mixture including molecular fluorine and at least one buffer gas and having a total pressure of less than substantially 2500 mbar, multiple electrodes within the discharge tube and connected to a pulsed discharge circuit for energizing the gas mixture, a line-selection optic for selecting one of multiple closely-spaced lines around 157 nm emitted from the discharge tube, a laser resonator including the line-selection optic and the discharge tube for generating a beam of laser pulses having a wavelength around 157 nm at a bandwidth of less than 0.6 pm, and an amplifier for boosting the energies of the laser pulses to desired energies for photolithographic processing.

A molecular fluorine laser system is also provided including a discharge tube filled with a gas mixture including molecular fluorine and at least one buffer gas and having a total pressure of less than substantially 2000 mbar, multiple electrodes within the discharge tube and connected to a pulsed discharge circuit for energizing the gas mixture, a line-selection optic for selecting one of multiple closely-spaced lines around 157 nm emitted from the discharge tube, a laser resonator including the line-selection optic and the discharge tube for generating a beam of laser pulses having a wavelength around 157 nm at a bandwidth of less than 0.6 pm, and an amplifier for boosting the energies of the laser pulses to desired energies for photolithographic processing.

A molecular fluorine laser system is further provided including a discharge tube filled with a gas mixture including molecular fluorine and at least one buffer gas and having a total pressure of less than substantially 1500 mbar, multiple electrodes within the discharge tube and connected to a pulsed discharge circuit for energizing the gas mixture, a line-selection optic for selecting one of multiple closely-spaced lines around 157 nm emitted from the discharge tube, a laser resonator including the line-selection optic and the discharge tube for generating a beam of laser pulses having a wavelength around 157 nm at a bandwidth of less than 0.6 pm, and an amplifier for boosting the energies of the laser pulses to desired energies for photolithographic processing.

A molecular fluorine laser system is also provided including a discharge tube filled with a gas mixture including molecular fluorine and at least one buffer gas and having a total pressure of less than substantially 1000 mbar, multiple electrodes within the discharge tube and connected to a pulsed discharge circuit for energizing the gas mixture, a line-selection optic for selecting one of multiple closely-spaced lines around 157 nm emitted from the discharge tube, a laser resonator including the line-selection optic and the discharge tube for generating a beam of laser pulses having a wavelength around 157 nm at a bandwidth of less than 0.6 pm, and an amplifier for boosting the energies of the laser pulses to desired energies for photolithographic processing.

A molecular fluorine laser system is further provided including a discharge tube filled with a gas mixture including molecular fluorine and at least one buffer gas, multiple electrodes within the discharge tube, a pulsed discharge circuit connected to the electrodes for energizing the gas mixture, a line-selection optic for selecting one of multiple closely-spaced lines around 157 nm emitted from the discharge tube, a laser resonator including the line-selection optic and the discharge tube for generating a beam of laser pulses having a wavelength around 157 nm at a bandwidth of less than 0.6 pm, a diagnostic module for measuring spectral information of the laser pulses, a processor for receiving diagnostic signals containing the spectral information from the diagnostic module, and a gas handling unit for receiving instruction signals from the processor and for adjusting the gas mixture based on information contained in the instruction signals.

A molecular fluorine laser system is further provided including a discharge tube filled with a gas mixture including molecular fluorine and at least one buffer gas and having a total pressure of less than substantially 2500 mbar, multiple electrodes within the discharge tube, a pulsed discharge circuit connected to the electrodes for energizing the gas mixture, a line-selection optic for selecting one of multiple closely-spaced lines around 157 nm emitted from the discharge tube, a laser resonator including the line-selection optic and the discharge tube for generating a beam of laser pulses having a wavelength around 157 nm at a bandwidth of less than 0.6 pm, a diagnostic module for measuring the bandwidth of the laser pulses, a processor for receiving diagnostic signals containing bandwidth information from the diagnostic module, and a gas handling unit for receiving instruction signals from the processor and for adjusting the total pressure of the gas mixture based on information contained in the instruction signals to control the bandwidth of the laser pulses.

BRIEF DESCRIPTION OF THE DRAWINGS

FIG. 11 lists related references and a table of bandwidths measured by the authors of these references.

INCORPORATION BY REFERENCE

What follows is a cite list of references each of which is, in addition to those references cited above in the priority section, hereby incorporated by reference into the detailed description of the preferred embodiment below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the preferred embodiment with the same effect as just described with respect to the following references:

U.S. patent application Ser. Nos. 09/453,670, 09/447,882, 09/317,695, 09/574,921, 09/512,417, 09/599,130, 09/694,246, 09/712,877, 09/738,849, 09/718,809, 09/733,874, and 09/780,124, each of which is assigned to the same assignee as the present application; and U.S. Pat. Nos. 6,154,470, 6,157,662, 6,219,368, and 5,901,163, and all patent, patent application and non-patent references mentioned in the background or specification of this application.

Detailed Description of the Preferred Embodiments

The preferred embodiments described below are drawn to a $F_2$ laser having a variably adjustable total gas pressure for adjusting the bandwidth of the laser emission around 157 nm. A $F_2$ laser is provided with a controlled total gas pressure, which is preferably below a typical excimer laser total laser tube gas pressure, for controlling the natural bandwidth of the laser emission around 157 nm, e.g., to substantially 0.5 pm or less. For example, the total pressure may be preferably below 2000 mbar and may be below 1500 mbar and may be below 1000 mbar. The $F_2$ partial pressure is preferably maintained at a desired amount such as 50 to 100 mbar (5% $F_2$:95% Ne), or 2 to 5 mbar $F_2$, while the remainder of the gas mixture is buffer gas. The total gas pressure is preferably controlled by controlling the partial pressure of the buffer gas in the gas mixture, wherein He and/or Ne is/are the preferred buffer gas or gases. Also preferably, the power or energy of the narrow-band output laser beam is boosted by being directed through an optical amplifier or increasing the driving voltage applied to the discharge electrodes, or otherwise as understood by those skilled in the art. Preferably and advantageously, the optical design of the resonator of the laser has minimal optical components that tend to significantly degrade under VUV light exposure.

Figure 1:
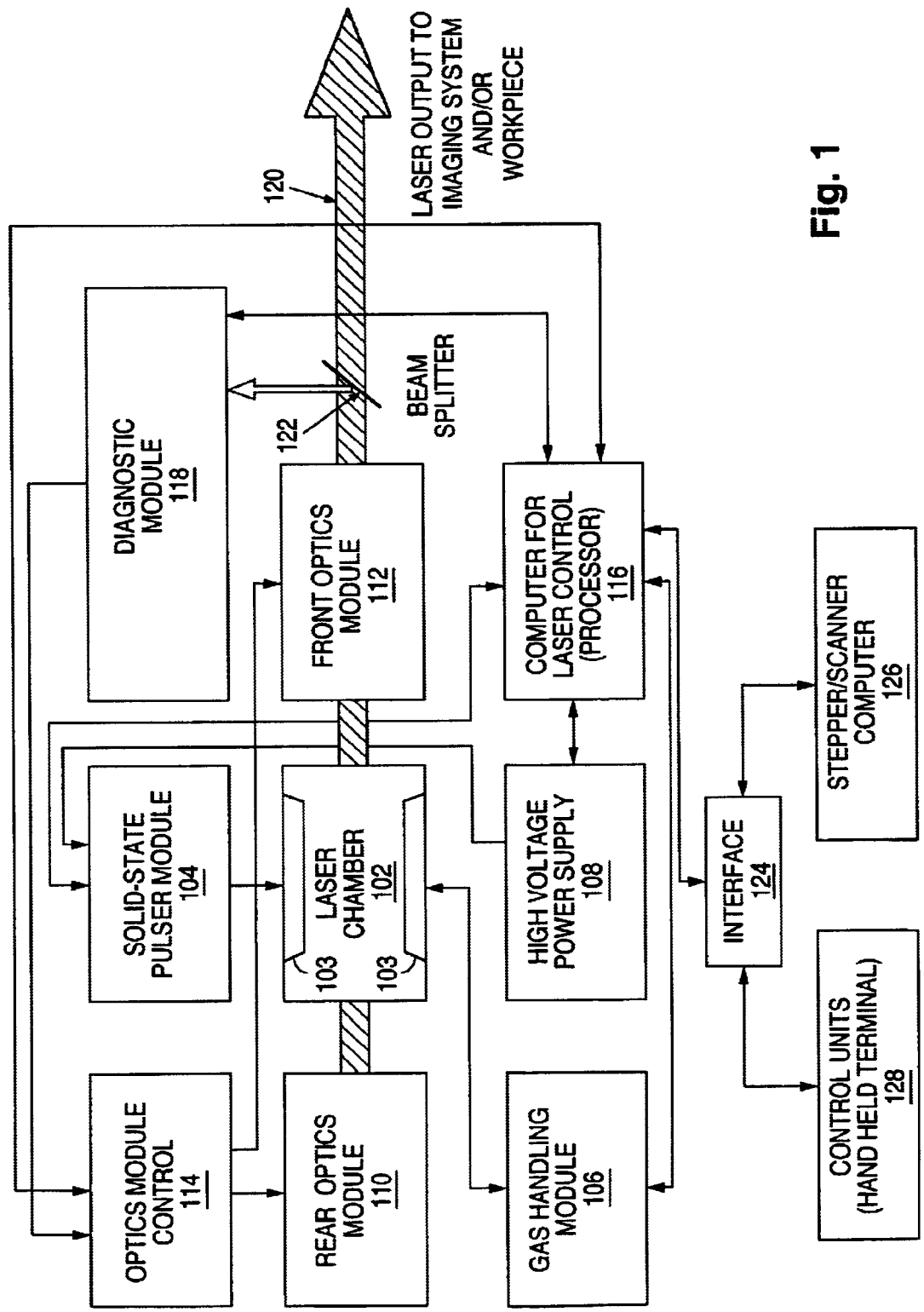
FIG. 1 shows a molecular fluorine laser system in accord with a preferred embodiment.

Referring to FIG. 1, an excimer or molecular fluorine laser system is schematically shown according to a preferred embodiment. The preferred gas discharge laser system is a VUV laser system, such as a molecular fluorine ($F_2$) laser system, for use with a vacuum ultraviolet (VUV) lithography system. Alternative configurations for laser systems for use in such other industrial applications as TFT annealing, photoablation and/or micromachining, e.g., include configurations understood by those skilled in the art as being similar to and/or modified from the system shown in FIG. 1 to meet the requirements of that application. For this purpose, alternative DUV or VUV laser system and component configurations are described at U.S. patent application Ser. Nos. 09/317,695, 09/130,277, 09/244,554, 09/452,353, 09/512,417, 09/599,130, 09/694,246, 09/712,877, 09/574,921, 09/738,849, 09/718,809, 09/629,256, 09/712,367, 09/771,366, 09/715,803, 09/738,849, 60/202,564, 60/204,095, 09/741,465, 09/574,921, 09/734,459, 09/741,465, 09/686,483, 09/715,803, and 09/780,124, and U.S. Pat. Nos. 6,005,880, 6,061,382, 6,020,723, 5,946,337, 6,014,206, 6,157,662, 6,154,470, 6,160,831, 6,160,832, 5,559,816, 4,611,270, 5,761,236, 6,212,214, 6,154,470, and 6,157,662, each of which is assigned to the same assignee as the present application and is hereby incorporated by reference.

The system shown in FIG. 1 generally includes a laser chamber 102 (or laser tube including a heat exchanger and fan for circulating a gas mixture within the chamber 102 or tube) having a pair of main discharge electrodes 103 connected with a solid-state pulser module 104, and a gas handling module 106. The gas handling module 106 has a valve connection to the laser chamber 102 so that halogen, rare and buffer gases, and preferably a gas additive, may be injected or filled into the laser chamber, preferably in premixed forms (see U.S. patent application Ser No. 09/513,025, which is assigned to the same assignee as the present application, and U.S. Pat. No. 4,977,573, which are each hereby incorporated by reference) for ArF, XeCl and KrF excimer lasers, and halogen and buffer gases, and any gas additive, for the $F_2$ laser. For the high power XeCl laser, the gas handling module may or may not be present in the overall system. The solid-state pulser module 104 is powered by a high voltage power supply 108. A thyratron pulser module may alternatively be used. The laser chamber 102 is surrounded by optics module 110 and optics module 112, forming a resonator. The optics module may include only a highly reflective resonator reflector in the rear optics module 110 and a partially reflecting output coupling mirror in the front optics module 112, such as is preferred for the high power XeCl laser. The optics modules 110 and 112 may be controlled by an optics control module 114, or may be alternatively directly controlled by a computer or processor 116, particular when line-narrowing optics are included in one or both of the optics modules 110, 112, such as is preferred when KrF, ArF or $F_2$ lasers are used for optical lithography.

The processor 116 for laser control receives various inputs and controls various operating parameters of the system. A diagnostic module 118 receives and measures one or more parameters, such as pulse energy, average energy and/or power, and preferably wavelength, of a split off portion of the main beam 120 via optics for deflecting a small portion of the beam toward the module 118, such as preferably a beam splitter module 122. The beam 120 is preferably the laser output to an imaging system (not shown) and ultimately to a workpiece (also not shown) such as particularly for lithographic applications, and may be output directly to an application process. The laser control computer 116 may communicate through an interface 124 with a stepper/scanner computer, other control units 126, 128 and/or other external systems.

The laser chamber 102 contains a laser gas mixture and includes one or more preionization electrodes (not shown) in addition to the pair of main discharge electrodes 103. Preferred main electrodes 103 are described at U.S. patent application Ser. No. 09/453,670 for photolithographic applications, which is assigned to the same assignee as the present application and is hereby incorporated by reference, and may be alternatively configured, e.g., when a narrow discharge width is not preferred. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred preionization units are set forth at U.S. patent application Ser. Nos. 09/692,265 (particularly preferred for KrF, ArF, $F_2$ lasers), 09/532,276 and 09/247,887, each of which is assigned to the same assignee as the present application, and alternative embodiments are set forth at U.S. Pat. Nos. 5,337,330, 5,818,865 and 5,991,324, all of the above patents and patent applications being hereby incorporated by reference.

The solid-state or thyratron pulser module 104 and high voltage power supply 108 supply electrical energy in compressed electrical pulses to the preionization and main electrodes 103 within the laser chamber 102 to energize the gas mixture. Components of the preferred pulser module and high voltage power supply may be described at U.S. patent application Ser. Nos. 09/640,595, 60/198,058, 60/204,095, 09/432,348 and 09/390,146, and 60/204,095, and U.S. Pat. Nos. 6,005,880, 6,226,307 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872, 6,151,346 and 5,729,562, each of which is hereby incorporated by reference.

The laser resonator which surrounds the laser chamber 102 containing the laser gas mixture includes optics module 110 preferably including line-narrowing optics for a line narrowed excimer or molecular fluorine laser such as for photolithography, which may be replaced by a high reflectivity mirror or the like in a laser system wherein either line-narrowing is not desired (for TFT annealling, e.g.), or if line narrowing is performed at the front optics module 112, or a spectral filter external to the resonator is used, or if the line-narrowing optics are disposed in front of the HR mirror, for narrowing the bandwidth of the output beam. In accord with a preferred embodiment herein, optics for selecting one of multiple lines around 157 nm may be used, e.g., one or more dispersive prisms or birefringent plates or blocks, wherein additional line-narrowing optics for narrowing the selected line may be left out. The total gas mixture pressure is preferably lower than conventional systems, e.g., lower than 3 bar, for producing the selected line at a narrow bandwidth such as 0.5 pm or less without using additional line-narrowing optics.

The laser chamber 102 is sealed by windows transparent to the wavelengths of the emitted laser radiation 120. The windows may be Brewster windows or may be aligned at another angle, e.g., 5°, to the optical path of the resonating beam. One of the windows may also serve to output couple the beam or as a highly reflective resonator reflector on the opposite side of the chamber 102 as the beam is outcoupled.

After a portion of the output beam 120 passes the outcoupler of the optics module 112, that output portion preferably impinges upon a beam splitter module 122 which includes optics for deflecting a portion of the beam to the diagnostic module 118, or otherwise allowing a small portion of the outcoupled beam to reach the diagnostic module 118, while a main beam portion 120 is allowed to continue as the output beam 120 of the laser system (see U.S. patent application Ser. Nos. 09/771,013, 09/598,552, and 09/712,877 which are assigned to the same assignee as the present invention, and U.S. Pat. No. 4,611,270, each of which is hereby incorporated by reference. Preferred optics include a beam splitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 118. A holographic beam sampler, transmission grating, partially transmissive reflection diffraction grating, grism, prism or other refractive, dispersive and/or transmissive optic or optics may also be used to separate a small beam portion from the main beam 120 for detection at the diagnostic module 118, while allowing most of the main beam 120 to reach an application process directly or via an imaging system or otherwise. These optics or additional optics may be used to filter out visible radiation such as the red emission from atomic fluorine in the gas mixture from the split off beam prior to detection.

The output beam 120 may be transmitted at the beam splitter module while a reflected beam portion is directed at the diagnostic module 118, or the main beam 120 may be reflected, while a small portion is transmitted to the diagnostic module 118. The portion of the outcoupled beam which continues past the beam splitter module is the output beam 120 of the laser, which propagates toward an industrial or experimental application such as an imaging system and workpiece for photolithographic applications.

Particularly for the molecular fluorine laser system, and for the ArF laser system, an enclosure (not shown) preferably seals the beam path of the beam 120 such as to keep the beam path free of photoabsorbing species. Smaller enclosures preferably seal the beam path between the chamber 102 and the optics modules 110 and 112 and between the beam splitter 122 and the diagnostic module 118. Preferred enclosures are described in detail in U.S. patent application Ser. Nos. 09/598,552, 09/594,892 and 09/131,580, which are assigned to the same assignee and are hereby incorporated by reference, and U.S. Pat. Nos. 6,219,368, 5,559,584, 5,221,823, 5,763,855, 5,811,753 and 4,616,908, all of which are hereby incorporated by reference.

The diagnostic module 118 preferably includes at least one energy detector. This detector measures the total energy of the beam portion that corresponds directly to the energy of the output beam 120 (see U.S. Pat. Nos. 4,611,270 and 6,212,214 which are hereby incorporated by reference). An optical configuration such as an optical attenuator, e.g., a plate or a coating, or other optics may be formed on or near the detector or beam splitter module 122 to control the intensity, spectral distribution and/or other parameters of the radiation impinging upon the detector (see U.S. patent application Ser. Nos. 09/172,805, 09/741,465, 09/712,877, 09/771,013 and 09/771,366, each of which is assigned to the same assignee as the present application and is hereby incorporated by reference).

One other component of the diagnostic module 118 is preferably a wavelength and/or bandwidth detection component such as a monitor etalon or grating spectrometer (see U.S. patent application Ser. Nos. 09/416,344, 09/686,483, and 09/791,431, each of which is assigned to the same assignee as the present application, and U.S. Pat. Nos. 4,905,243, 5,978,391, 5,450,207, 4,926,428, 5,748,346, 5,025,445, 6,160,832, 6,160,831 and 5,978,394, all of the above wavelength and/or bandwidth detection and monitoring components being hereby incorporated by reference. In accord with a preferred embodiment herein, the bandwidth is monitored and controlled in a feedback loop including the processor 116 and gas handling module 106. The total pressure of the gas mixture in the laser tube 102 is controlled to a particular value for producing an output beam at a particular bandwidth.

Other components of the diagnostic module may include a pulse shape detector or ASE detector, such as are described at U.S. patent application Ser. Nos. 09/484,818 and 09/418,052, respectively, each of which is assigned to the same assignee as the present application and is hereby incorporated by reference, such as for gas control and/or output beam energy stabilization, or to monitor the amount of amplified spontaneous emission (ASE) within the beam to ensure that the ASE remains below a predetermined level, as set forth in more detail below. There may be a beam alignment monitor, e.g., such as is described at U.S. Pat. No. 6,014,206, or beam profile monitor, e.g., U.S. patent application Ser. No. 09/780,124, which is assigned to the same assignee, wherein each of these patent documents is hereby incorporated by reference.

The processor or control computer 116 receives and processes values of some of the pulse shape, energy, ASE, energy stability, energy overshoot for burst mode operation, wavelength, spectral purity and/or bandwidth, among other input or output parameters of the laser system and output beam. The processor 116 also controls the line narrowing module to tune the wavelength and/or bandwidth or spectral purity, and controls the power supply and pulser module 104 and 108 to control preferably the moving average pulse power or energy, such that the energy dose at points on the workpiece is stabilized around a desired value. In addition, the computer 116 controls the gas handling module 106 which includes gas supply valves connected to various gas sources. Further functions of the processor 116 such as to provide overshoot control, energy stability control and/or to monitor input energy to the discharge, are described in more detail at U.S. patent application Ser. No. 09/588,561, which is assigned to the same assignee and is hereby incorporated by reference.

Figure 2:
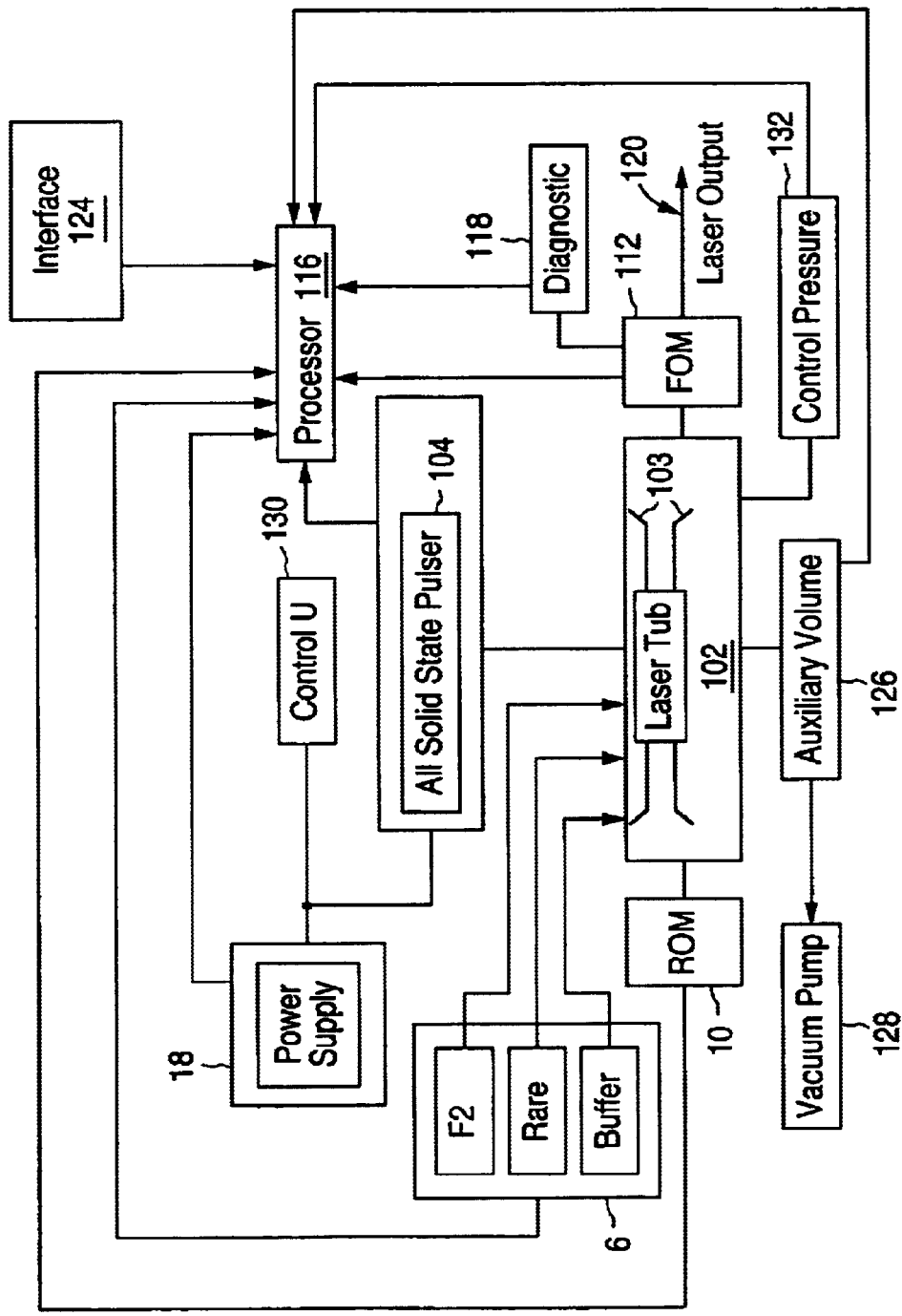
FIG. 2 shows a molecular fluorine laser system including an auxiliary volume in accord with a preferred embodiment.

As shown in FIG. 1, the processor 116 preferably communicates with the solid-state or thyratron pulser module 104 and HV power supply 108, separately or in combination, the gas handling module 106, the optics modules 110 and/or 112, the diagnostic module 118, and an interface 124. These laser system components are also shown in FIG. 2. A specific energy control component 130 is also shown in FIG. 2 for controlling the energy supplied to the electrodes 103 by the pulser 104 and power supply 108. The processor 116 may also control an auxiliary volume 126 (see U.S. patent application Ser. No. 09/780,120, which is assigned to the same assignee as the present application and is hereby incorporated by reference) which may be connected to a vacuum pump 128 for releasing gases from the laser tube 102 for reducing a total pressure in the tube 102 according to preferred embodiments set forth in more detail below. The total pressure may be initially at the lower pressure desired for producing a bandwidth of 5 pm or below, as is preferred, and no auxiliary volume 126 may be used. The use of the auxiliary volume 126 however permits a wide range of pressures to be controlled as the pressure in the laser tube 102, and rapid adjustments of the total pressure may be thereby made.

Total pressure adjustments in the form of releases of gases or reduction of the total pressure within the laser tube 102 are preferably facilitated by using the auxiliary volume 126. A valve is opened between the auxiliary volume 126 and the gas mixture in the laser tube 102 when the auxiliary volume 126 is at lower pressure than the laser tube 102, preferably due to the vacuum pump 128 being connected to the auxiliary volume 126 before or during the pressure release. Total pressure adjustments in the form of increases in the total pressure may be performed using the valves of the gas handling unit 106 and injecting combinations of gases or only a single gas such as the buffer gas of helium, neon or a combination thereof. Total pressure adjustments may be followed by gas composition adjustments if it is determined that, e.g., other than the desired partial pressure of halogen gas is within the laser tube 102 after the total pressure adjustment. Total pressure adjustments may also be performed after gas replenishment actions, and may be performed in combination with smaller adjustments of the driving voltage to the discharge than would be made if no pressure adjustments were performed in combination.

The auxiliary volume 126 is connected to the laser tube 102 for releasing gas from the laser tube 102 into the volume 126 based on control signals received from the processor 116. The processor 116 regulates the release of gases via a valve assembly to the auxiliary volume 126, and also regulates the delivery of gases or mixtures of gases to the laser tube 102 via a valve assembly or system of valves associated with the gas handling unit 106.

The auxiliary volume 126 preferably includes a reservoir or compartment having a known volume and preferably having a pressure gauge attached for measuring the pressure in the auxiliary volume. Alternatively or in combination with the pressure gauge, a flow rate controller 132 allows the processor to control the flow rate of gases from the tube 102 to the auxiliary volume 126, so that the processor may control and/or determine precisely how much gas is being released or has been released. The auxiliary volume 126 as well as the laser tube may also each have means, such as a thermocouple arrangement, for measuring the temperature of the gases within the volume 126 and tube 102. The compartment may be a few to thousands of $cm^3$ or so in volumetric size (the laser tube 102 may be around 30,000 to 50,000 $cm^3$ volumetrically).

At least one valve is included for controlling the flow of gases between the laser tube 102 and the auxiliary volume 126. Additional valves may be included therebetween. Another valve is also included between the vacuum pump 128 and the auxiliary volume 126 for controlling access between the vacuum pump 128 and the auxiliary volume 126. A further valve or valves may be provided between either or both of the vacuum pump 128 and auxiliary volume 126 and the laser tube 102 and the auxiliary volume 126 for controlling the atmosphere in the line therebetween, and an additional pump or the same vacuum pump 128 may be used to evacuate the line between the laser tube 102 and auxiliary volume 126 either directly or through the auxiliary volume 126.

Predetermined amounts of the gas mixture in the tube 102 are preferably released into the auxiliary volume 126 from the laser tube 102 for total pressure releases according to algorithms which provide instructions to the processor 116 (see the Ser. No. 09/780,120 application). This same auxiliary volume 126 may be used in partial, mini- or macro-gas replacement operations such as are set forth in the Ser. No. 09/734,459 application, incorporated by reference above. As an example, the gas handling unit 106 connected to the laser tube 102 either directly or through an additional valve assembly, such as may include a small compartment for regulating the amount of gas injected (see the '459 application), may include a gas line for injecting a premix A including 1%$F_2$:99% Ne (or 5% $F_2$:95% Ne, or another mixture), and another gas line for injecting a buffer gas of helium and/or neon for a $F_2$ laser. Thus, by injecting premix A into the tube 102 via the valve assembly, the fluorine concentration (for the $F_2$ laser, e.g.) in the laser tube 102 may be replenished. Then, a certain amount of gas is released corresponding to the amount that was injected. Additional gas lines and/or valves may be used for injecting additional gas mixtures. New fills, partial and mini gas replacements and gas injection procedures, e.g., enhanced and ordinary micro-halogen injections, and any and all other gas replenishment actions are initiated and controlled by the processor 116 which controls valve assemblies of the gas handling unit 106, laser tube 102, auxiliary volume 126 and vacuum pump 128 based on various input information in a feedback loop.

An exemplary method according to the present invention is next described for accurately and precisely releasing gas from the laser tube 102 into the auxiliary volume 126. It is noted that a similar procedure for accurately and precisely replenishing gases including injection into the laser tube 102 are preferably used for injecting small amounts of gases such that significant output beam parameters are not significantly disturbed, if at all, with each gas injection. For example, the processor 116, which is monitoring a parameter indicative of the fluorine concentration in the laser tube 102, may initiate a micro-halogen injection ($\mu$HI) when the processor 116 determines it is time to increase the halogen concentration in the gas mixture in the laser tube 102 (further details of preferred gas replenishment actions are described at the '459 application).

With respect to preferred total pressure releases according to preferred embodiments herein, the processor 116 determines that it is time for a pressure release. The processor 116 then sends a signal that causes a valve to open between the tube 102 and the volume 126 to gases to flow from the tube 102 to the volume 126 either to a predetermined pressure in the auxiliary volume 126 or according to a known flow rate and time that the valve is to be opened. Then, the valve is closed. Preferably, the pressure in the tube 102 after the release is determined by either a pressure gauge on the tube 102 or by calculation using the known amount of gas released and the amount of gas that was in the tube 102 before the release. A valve between the vacuum pump 128 and the auxiliary volume 126 is then preferably opened allowing the gas in the volume 126 to be pumped out of the volume.

If the pressure in the tube was 3 bar prior to the release, and the release is such that the pressure in the auxiliary volume was increased to, e.g., around 3 bar after the release, then 0.5×[(volume of auxiliary volume 126)/volume of laser tube 102] bar would be the pressure reduction in the tube 102 as a result of the release. Particular total pressure release or addition algorithms are set forth in the Ser. No. 09/780,120 application.

The above calculation may be performed by the processor 116 to determine more precisely how much gas was released, or prior to the release, the pressure in the auxiliary volume 126 may be set according to a calculation by the processor 116 concerning how much gas should be released based on the information received by the processor 116 and/or based on pre-programmed criteria. Preferably, the auxiliary volume 126 is pumped down such that a substantially zero pressure approximation may be used, or a very low pressure as measured by a gauge measuring the pressure in the interior of the volume 126. A correction for difference in temperature between the gas in the tube 102 and the auxiliary volume 126 may also be performed by the processor 116 for greater accuracy, or the temperature within the auxiliary volume may be preset, e.g., to the temperature within the laser tube 102.

There may be more than one auxiliary volume like the volume 126, as described above, each having different properties such as volumetric space. For example, there may be two compartments, one for gas replacement procedures and one for total pressure releases. There may be more than two, for still further versatility in the amounts of gas to be released, and for adjusting driving voltage ranges corresponding to different gas action algorithms (see the '459 application).

The gas mixture lifetime may be advantageously increased by using gas replenishment procedures as described herein. This discussion below may be supplemented by the description in any of U.S. patent application Ser. Nos. 09/447,882, 09/734,459 and/or 09/780,120, which are assigned to the same assignee as the present application, and/or U.S. Pat. No. 6,212,214, each of which is hereby incorporated by reference.

The laser gas mixture is initially filled into the laser chamber 102 in a process referred to herein as a "new fills". In such procedure, the laser tube is evacuated of laser gases and contaminants, and re-filled with an ideal gas composition of fresh gas. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405, 6,157,162 and 4,977,573 and U.S. patent application Ser. Nos. 09/513,025, 09/447,882, 09/418,052, and 09/588,561, each of which is assigned to the same assignee and is hereby incorporated by reference into the present application. The concentration of the fluorine in the gas mixture may range from 0.003% to 1.00%, and is preferably around 0.1%. An additional gas additive, such as a rare gas or otherwise, may be added for increased energy stability, overshoot control and/or as an attenuator as described in the Ser. No. 09/513,025 application incorporated by reference above. Specifically, for the F2-laser, an addition of xenon, krypton and/or argon may be used. The concentration of xenon or argon in the mixture may range from 0.0001% to 0.1% . For an ArF-laser, an addition of xenon or krypton may be used also having a concentration between 0.0001% to 0.1% . For the KrF laser, an addition of xenon or argon may be used also having a concentration between 0.0001% to 0.1% . Although the preferred embodiments herein are particularly drawn to use with a $F_2$ laser, adjustments to the total pressure may be performed for controlling the bandwidth of other systems such as ArF, KrF, and XeCl excimer lasers.

Halogen and rare gas injections, including micro-halogen injections of, e.g., 1–3 milliliters of halogen gas, mixed with, e.g., 20–60 milliliters of buffer gas or a mixture of the halogen gas, the buffer gas and a active rare gas, per injection for a total gas volume in the laser tube 102 of, e.g., 100 liters, total pressure adjustments and gas replacement procedures are performed using the gas handling module 106 preferably including a vacuum pump, a valve network and one or more gas compartments. The gas handling module 106 receives gas via gas lines connected to gas containers, tanks, canisters and/or bottles. Some preferred and alternative gas handling and/or replenishment procedures, other than as specifically described herein (see below), are described at U.S. Pat. Nos. 4,977,573, 6,212,214 and 5,396,514 and U.S. patent application Ser. Nos. 09/447,882, 09/418,052, 09/734,459, 09/513,025 and 09/588,561, each of which is assigned to the same assignee as the present application, and U.S. Pat. Nos. 5,978,406, 6,014,398 and 6,028,880, all of which are hereby incorporated by reference. A xenon gas supply may be included either internal or external to the laser system according to the '025 application, mentioned above.

Total pressure adjustments in the form of releases of gases or reduction of the total pressure within the laser tube 102 may also be performed. Total pressure adjustments may be followed by gas composition adjustments if it is determined that, e.g., other than the desired partial pressure of halogen gas is within the laser tube 102 after the total pressure adjustment. Total pressure adjustments may also be performed after gas replenishment actions, and may be performed in combination with smaller adjustments of the driving voltage to the discharge than would be made if no pressure adjustments were performed in combination.

Gas replacement procedures may be performed and may be referred to as partial, mini- or macro-gas replacement operations, or partial new fill operations, depending on the amount of gas replaced, e.g., anywhere from a few milliliters up to 50 liters or more, but less than a new fill, such as are set forth in the Ser. No. 09/734,459 application, incorporated by reference above. As an example, the gas handling unit 106 connected to the laser tube 102 either directly or through an additional valve assembly, such as may include a small compartment for regulating the amount of gas injected (see the '459 application), may include a gas line for injecting a premix A including 1% $F_2$:99% Ne, and another gas line for injecting a premix B including 1% Kr:99% Ne, for a KrF laser. For an ArF laser, premix B would have Ar instead of Kr, and for a $F_2$ laser premix B is not used. Thus, by injecting premix A and premix B into the tube 102 via the valve assembly, the fluorine and krypton concentrations (for the KrF laser, e.g.) in the laser tube 102, respectively, may be replenished. Then, a certain amount of gas is released corresponding to the amount that was injected. Additional gas lines and/or valves may be used for injecting additional gas mixtures. New fills, partial and mini gas replacements and gas injection procedures, e.g., enhanced and ordinary micro-halogen injections, such as between 1 milliliter or less and 3–10 milliliters, and any and all other gas replenishment actions are initiated and controlled by the processor 116 which controls valve assemblies of the gas handling unit 106 and the laser tube 102 based on various input information in a feedback loop. These gas replenishment procedures may be used in combination with gas circulation loops and/or window replacement procedures to achieve a laser system having an increased servicing interval for both the gas mixture and the laser tube windows.

A general description of the line-narrowing features of embodiments of the laser system particularly for use with photolithographic applications is provided here, followed by a listing of patent and patent applications being incorporated by reference as describing variations and features that may used within the scope of the present invention for providing an output beam with a high spectral purity or bandwidth (e.g., below 1 pm and preferably 0.6 pm or less). These exemplary embodiments may be used for selecting the primary line $X_1$ only, or may be used to provide additional line narrowing to that provided by controlling the total pressure. Exemplary line-narrowing optics contained in the optics module 110 include a beam expander, an optional interferometric device such as an etalon or otherwise as described in the Ser. No. 09/715,803 application, incorporated by reference above, and a diffraction grating, which produces a relatively high degree of dispersion, for a narrow band laser such as is used with a refractive or catadioptric optical lithography imaging system. As mentioned above, the front optics module may include line-narrowing optics as well (see the Ser. Nos. 09/715,803, 09/738,849, and 09/718,809 applications, each being assigned to the same assignee and hereby incorporated by reference).

For a semi-narrow band laser such as is used with an all-reflective imaging system, the grating may be replaced with a highly reflective mirror, and a lower degree of dispersion may be produced by a dispersive prism. A semi-narrow band laser would typically have an output beam linewidth in excess of 1pm and may be as high as 100 pm in some laser systems, depending on the characteristic broadband bandwidth of the laser.

The beam expander of the above exemplary line-narrowing optics of the optics module 110 preferably includes one or more prisms. The beam expander may include other beam expanding optics such as a lens assembly or a converging/diverging lens pair. The grating or a highly reflective mirror is preferably rotatable so that the wavelengths reflected into the acceptance angle of the resonator can be selected or tuned. Alternatively, the grating, or other optic or optics, or the entire line-narrowing module may be pressure tuned, such as is set forth in the Ser. No. 09/771,366 application and the U.S. Pat. No. 6,154,470 patent, each of which is assigned to the same assignee and is hereby incorporated by reference. The grating may be used both for dispersing the beam for achieving narrow bandwidths and also preferably for retroreflecting the beam back toward the laser tube. Alternatively, a highly reflective mirror is positioned after the grating which receives a reflection from the grating and reflects the beam back toward the grating in a Littman configuration, or the grating may be a transmission grating. One or more dispersive prisms may also be used, and more than one etalon may be used.

Depending on the type and extent of line-narrowing and/or selection and tuning that is desired, and the particular laser that the line-narrowing optics are to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, 6.081,542, 6,061,382, 5,946,337, 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, and any of the patent applications mentioned above and below herein, may be consulted to obtain a line-narrowing configuration that may be used with a preferred laser system herein, and each of these patent references is each hereby incorporated by reference into the present application.

Optics module 112 preferably includes means for outcoupling the beam 120, such as a partially reflective resonator reflector. The beam 120 may be otherwise outcoupled such as by an intra-resonator beam splitter or partially reflecting surface of another optical element, and the optics module 112 would in this case include a highly reflective mirror. The optics control module 114 preferably controls the optics modules 110 and 112 such as by receiving and interpreting signals from the processor 16, and initiating realignment or reconfiguration procedures (see the '353, '695, '277, '554, and '527 applications mentioned above).

The preferred embodiments relate particularly to excimer and molecular fluorine laser systems configured for adjustment of a total pressure in the laser tube 102 by using gas handling procedures, including total pressure releases and increases, of the gas mixture in the laser tube 102. The halogen and the rare gas concentrations are maintained constant during laser operation by gas replenishment actions for replenishing the amount of halogen, rare gas and buffer gas in the laser tube for KrF and ArF excimer lasers, and halogen and buffer gas for molecular fluorine lasers, such that these gases are maintained in a same predetermined ratio as are in the laser tube 102 following a new fill procedure. In addition, gas injection actions such as $\mu$HIs as understood from the '882 application, mentioned above, may be advantageously modified into micro gas replacement procedures, such that the increase in energy of the output laser beam may be compensated by reducing the total pressure. In contrast, or alternatively, conventional laser systems would reduce the input driving voltage so that the energy of the output beam is at the predetermined desired energy. In this way, the driving voltage is maintained within a small range around $HV_{opt}$, while the gas procedure operates to replenish the gases and maintain the average pulse energy or energy dose, such as by controlling an output rate of change of the gas mixture or a rate of gas flow through the laser tube 102. Advantageously, the gas procedures set forth herein permit the laser system to operate within a very small range around $HV_{opt}$, while still achieving average pulse energy control and gas replenishment, and increasing the gas mixture lifetime or time between new fills.

The laser chamber 102 contains a laser gas mixture including molecular fluorine and one or more buffer gases, wherein the total pressure may be adjusted to a predetermined pressure to adjust the bandwidth of the laser emission, as discussed in more detail below. Preferably and advantageously, the preferred embodiment does not have additional line-narrowing optics in the laser resonator, or includes only line-selection optics for selecting the main line at $\lambda_1 \approx 157.63094$ nm and suppressing any other lines around 157 nm that may be naturally emitted by the $F_2$ laser. Therefore, in one embodiment, the optics module 110 has only a highly reflective resonator mirror, and the optics module 112 has only a partially reflective resonator reflector. In another embodiment, suppression of the other lines (i.e., other than $\lambda_1$) around 157 nm is performed by an outcoupler having a partially reflective inner surface and being made of a block of birefringent material or a VUV transparent block with a coating, either of which has a transmission spectrum which is periodic due to interference and/or birefringence, and has a maximum at $\lambda_1$ and a minimum at a secondary line. In another embodiment, simple optics such as a dispersive prism or prisms may be used for line-selection only, and not for narrowing of the main line at $\lambda_1$. The advantageous gas mixture composition of the preferred embodiment enables a narrow bandwidth, e.g., substantially 5 pm or below 0.5 pm without narrowing the free-running main line at $\lambda_1$ using additional optics.

The processor 116 receives values of the bandwidth from the spectrometer of the diagnostic module 118 and controls the total pressure in the discharge chamber 102 in conjunction with the gas handling module 106 to provide a stable and selected bandwidth of the output beam. The laser gas mixture is initially filled into the laser chamber 102 during new fills. The gas composition for a very stable excimer laser in accord with the preferred embodiment uses helium or neon or a mixture of helium and neon as buffer gas, depending on the laser. Preferably, a mixture of 5% (or less) $F_2$ in Ne with He as the remaining buffer gas in the discharge chamber 102 is used. The total gas pressure is advantageously adjustable between around 1500 and 4000 mbar for adjusting the bandwidth of the laser. The total pressure may be further reduced below 1500 mbar to perhaps as low as 1000 mbar, or even lower. The partial pressure of the He buffer gas is preferably adjusted to adjust the total pressure, such that the amount of molecular fluorine in the laser tube 102 is not varied from an optimal, pre-selected amount.

Figure 3:
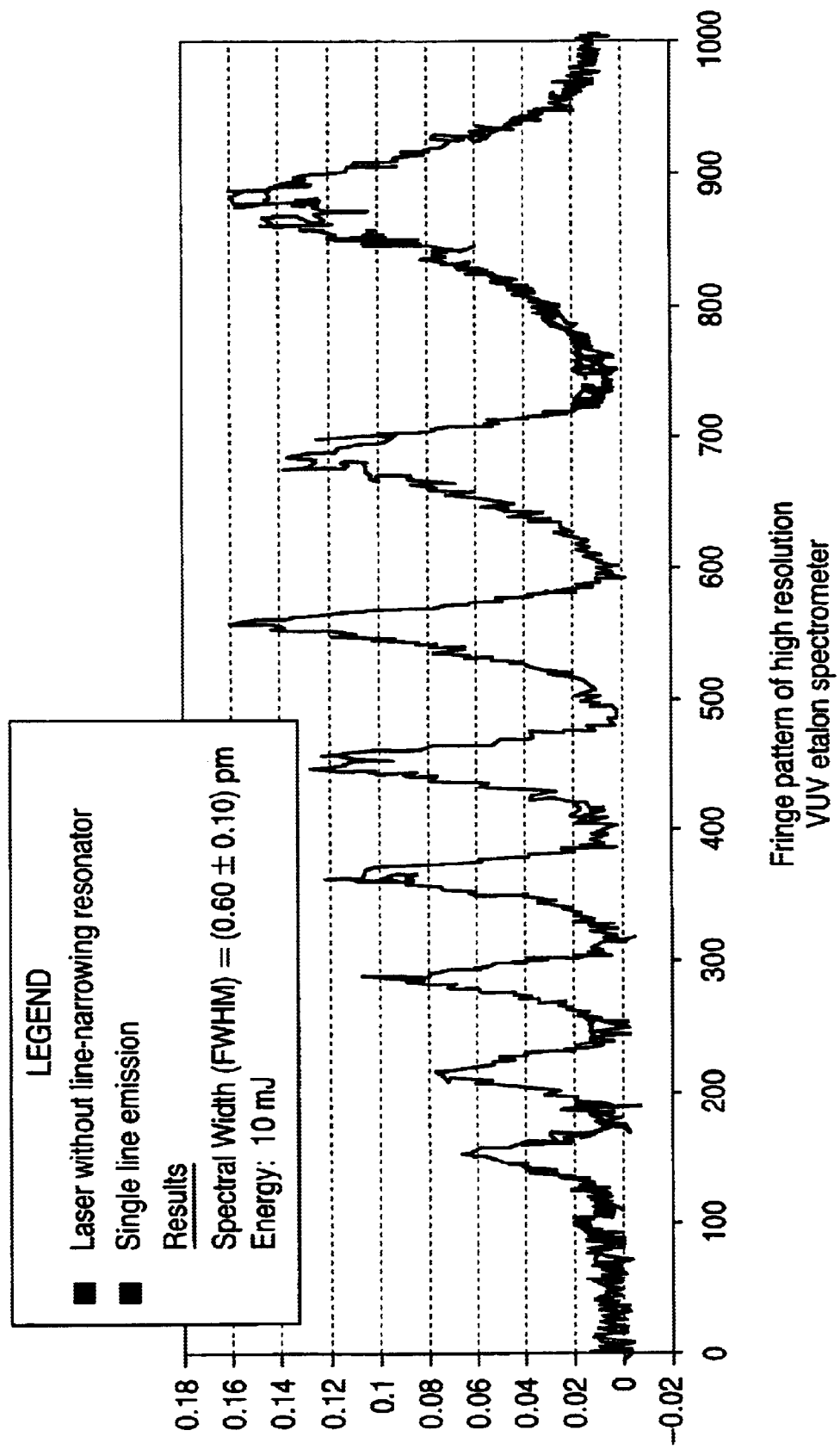
FIG. 3 shows the natural bandwidth of an $F_2$ laser measured with a high resolution vacuum etalon spectrometer.

FIG. 3 shows the natural bandwidth of an $F_2$ laser measured with a high resolution vacuum etalon spectrometer. The spectrometer had an apparatus function f=around 0.1 pm. The laser system used to measure the data for making the plot of FIG. 3 was $F_2$ (5% in Ne): balance He, wherein the total pressure was around 3000 mbar. The spectral width or bandwidth of the single emission line was determined from the data shown in the graph of FIG. 3 to be 0.6 pm+/−0.1 pm, and the energy of the beam measured was 10 mJ. Although this energy is around that which is desired for photolithographic applications, the bandwidth is above that which is desired herein.

Figure 4A:
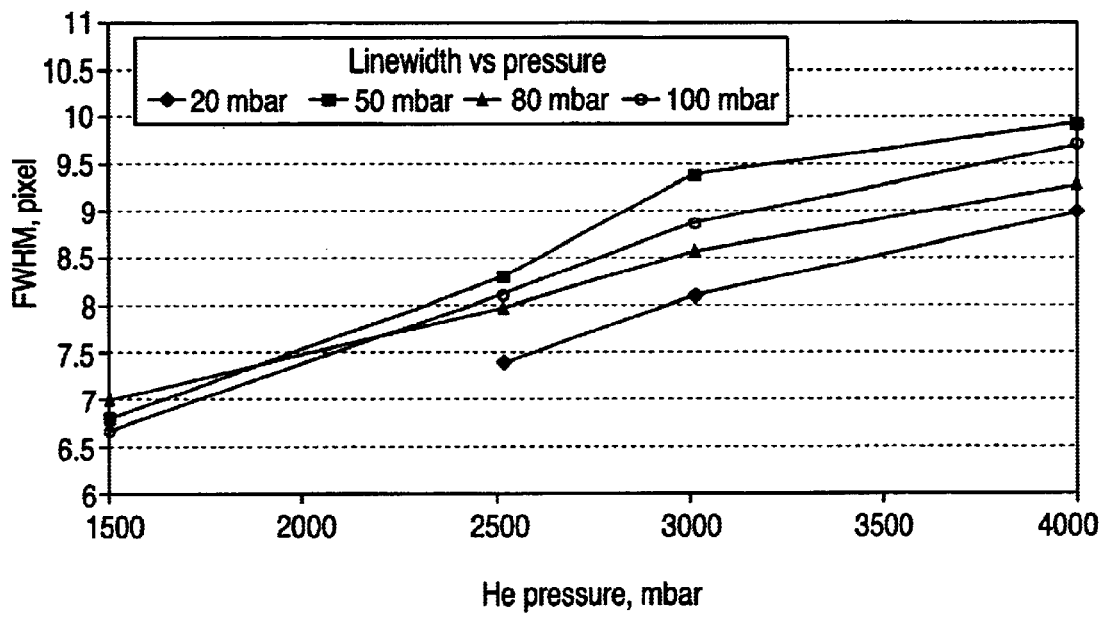
FIG. 4a shows a pressure dependence of the bandwidth in a pressure range from 1500 mbar to 4000 mbar using the high resolution etalon spectrometer, and a CCD array, used to obtain the spectrum of FIG. 3.

FIG. 4a shows the total gas mixture pressure dependence of the bandwidth in a pressure range from 1500 pm to 4000 pm using the high resolution etalon spectrometer, and a CCD array, the same or similar to that used to obtain the graph of FIG. 3. Four gas mixes were used having varying $F_2$ contents: the first around 20 mbar $F_2$ (5% in Ne), the second around 50 mbar $F_2$ (5% in Ne), the third around 80 mbar $F_2$ (5% in Ne) and the fourth around 100 mbar (5% $F_2$in Ne), with the remainder of the gas in the gas mixture being He buffer gas. Although the vertical axis in FIG. 4a is measured in pixels on the CCD array, the corresponding bandwidths measured may be easily determined based on the dispersive resolution of the spectrometer being around 0.082 pm/pixel. The general trend of reducing bandwidth with reduced total pressure is easily observed in FIG. 4a.

Figure 4B:
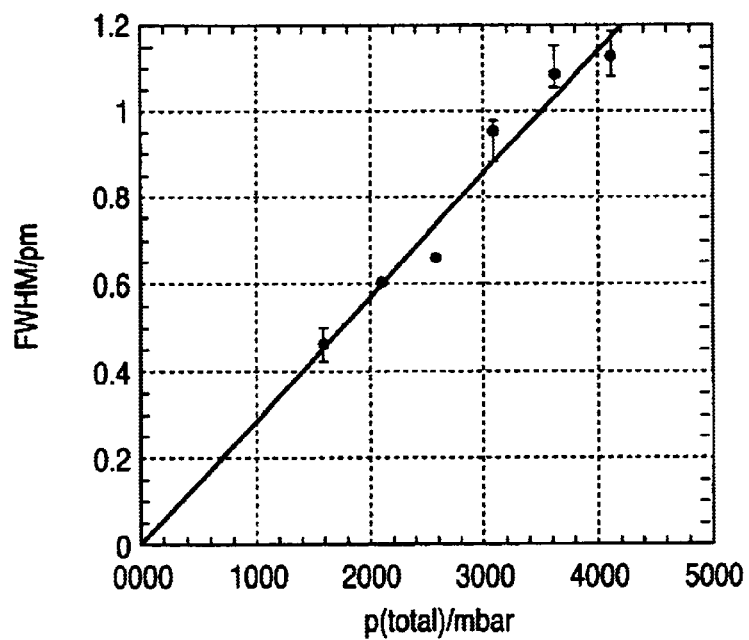
FIG. 4b shows a pressure dependence of the bandwidth in a pressure range from 0 mbar to 5000 mbar indicating a linear dependence of the bandwidth on the total gas pressure in the $F_2$ laser tube.

FIG. 4b shows a pressure dependence of the bandwidth in a pressure range from 0 mbar to 5000 mbar indicating a linear dependence of the bandwidth on the total gas pressure in the $F_2$ laser tube. FIG. 4b shows that at a total pressure of 0 mbar, the bandwidth is 0 mbar, and at a total pressure of less than 2500 mbar, the bandwidth is less than around 0.7 pm, and at a total pressure of less than 2000 mbar, the bandwidth is less than around 0.6 pm, and at a total pressure of less than 1500 mbar, the bandwidth is less than around 0.4 pm, and at a total pressure of less than 1000 mbar, the bandwidth is less than around 0.3 pm, and at a total pressure of less than 500 mbar, the bandwidth is less than around 0.15 pm. As mentioned above, the trade-off for reducing the total pressure and achieving an advantageously smaller bandwidth is loss of energy that may be compensated using an amplifier or increasing the driving voltage, varying the amount of fluorine in the laser tube, varying the reflectivity of the outcoupler, perhaps increasing the repetition rate (to increase the energy dose per time), lengthening the electrodes, etc. Also, the bandwidth may be maintained just at a specified bandwidth, and not below even though the pressure could be reduced to achieve a lower bandwidth than is specified, in order to maintain the energy at a specified level. A balancing analysis is performed, and the flexibility of being able to select a bandwidth and then adjust the system to maintain the specified energy is highly advantageous.

The pressure dependence from an observation of the plot of FIG. 4a was around d(bandwidth)/d(total pressure) ≈0.1 pm/bar, although the dependence appeared to be greater, e.g., 1.5 pm/bar, at total pressures below around 2500 mbar. With respect to the vertical axis, 8.5 pixels corresponds to a bandwidth around 0.70 pm, 7.0 pixels to around 0.58 pm, and 10 pixels to around 0.82 pm. From these preliminary data, it is expected that a bandwidth less than 0.4 pm would be achieved using 1000 mbar total pressure in the gas mix, preferably with around 50 mbar $F_2$ (5% in Ne): remainder He (or around 950 mbar He). A bandwidth of around 0.5 pm or less is achieved using 2 bar total pressure in the gas mix. As illustrated in both FIGS. 3 and 4a–4b, a bandwidth around 0.6 pm is achieved with a gas pressure of 3 bar. FIG. 4b shows a bandwidth dependence on the total pressure of around 0.3 pm/bar, illustrating that the pressure dependence may vary with other laser conditions and/or parameters.

Figure 5:
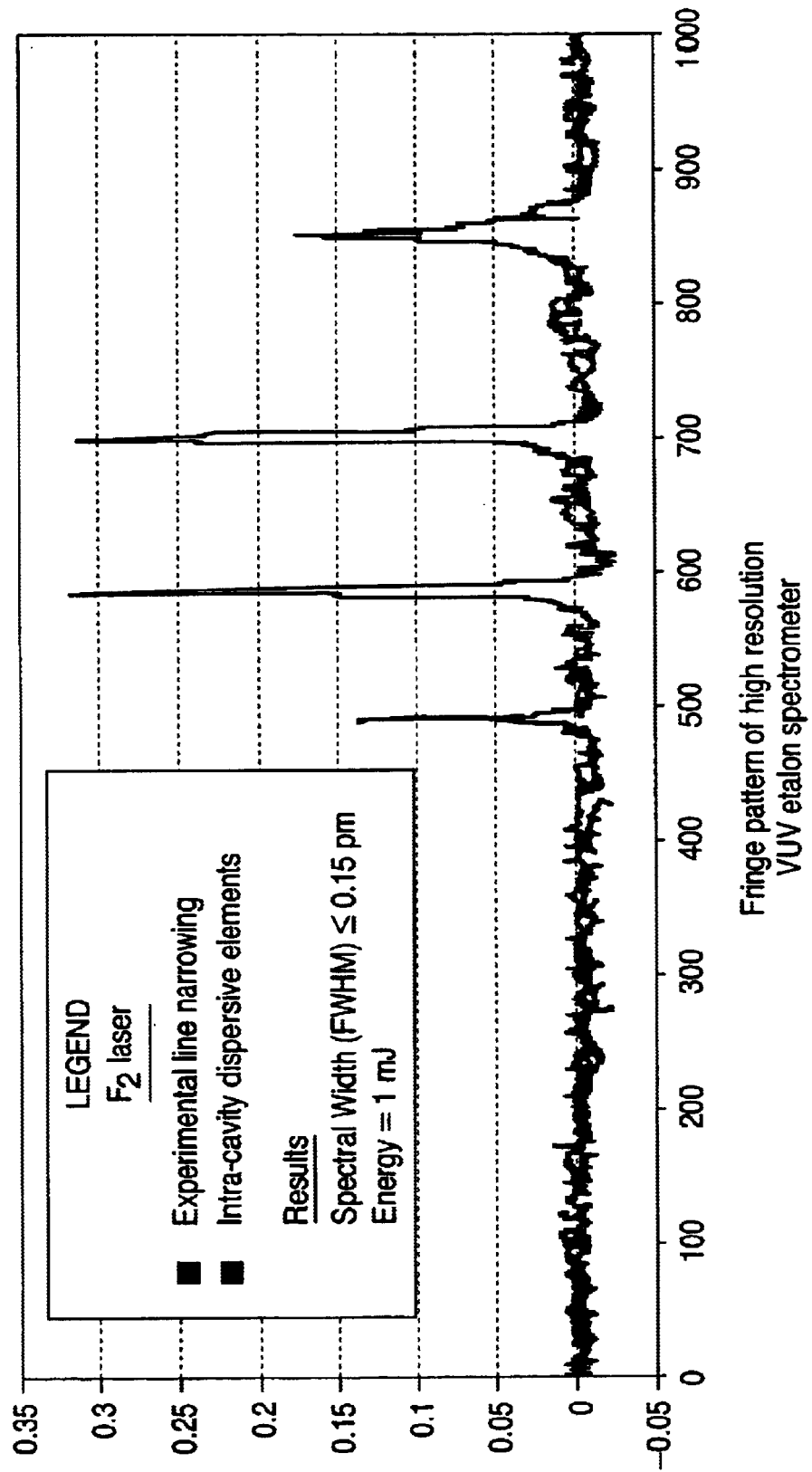
FIG. 5 shows a fringe pattern of high resolution VUV etalon spectrometer for measuring a line-narrowed bandwidth of an $F_2$ laser using intracavity line-narrowing optics.

FIG. 5 shows the line-narrowed bandwidth of an $F_2$ laser using intracavity line-narrowing optics. The intracavity line-narrowing optics used in the resonator of the $F_2$ laser allowed a very narrow bandwidth of less than around 0.15 pm. The energy of the beam was reduced to around 1 mJ, which is below that which is desired for photolithographic applications. Intracavity line-narrowing optics, such as those described above such as interferometric devices such as etalons or otherwise as set forth in the Ser. No. 09/715,803 application, or gratings, or grisms, or combinations with dispersive prisms and preferably using a beam expander for lowering the divergence and expanding the beam prior to being dispersed, may be used to narrow the selected $F_2$-laser emission line alternatively to, or in combination with, the use of low total pressure, e.g., 1000 to 2500 mbar, to achieve a very narrow bandwidth. In a preferred embodiment herein, the low pressure is used either alone, i.e., with no intracavity line-narrowing, or in combination therewith. In each case, there is reduction in output energy for a same input electrical energy to the discharge. In the case of using both lower pressure and intracavity line-narrowing optics, the energy is reduced by both of these factors.

Figure 6:
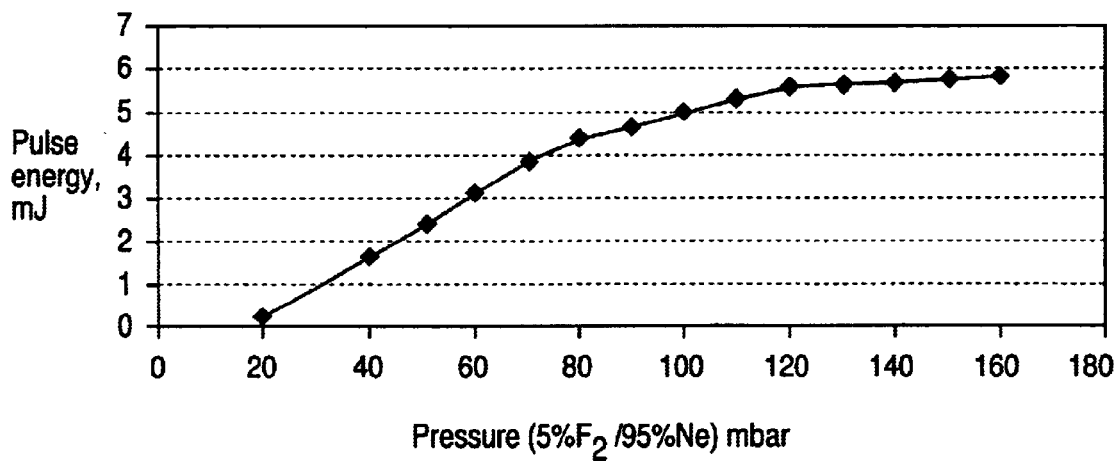
FIG. 6 the $F_2$ partial pressure dependence of the pulse energy for a $F_2$ laser.

FIG. 6 illustrates the $F_2$ partial pressure dependence of the pulse energy for an $F_2$ laser. The total pressure of the gas mixture of the $F_2$ laser used to produce the graph of pulse energy versus $F_2$ partial pressure was maintained about constant at 1600 mbar. The graph in FIG. 6 shows that for very low $F_2$ partial pressures, the pulse energy is quite low. However, the pulse energy is not very much increased for added fluorine to the gas mixture after about 100 mbar 5% $F_2$ in Ne. A pulse energy of around 5.5 mJ was achieved at 1600 mbar total pressure including 100 mbar $F_2$ 5% in Ne with balance He.

Figure 7:
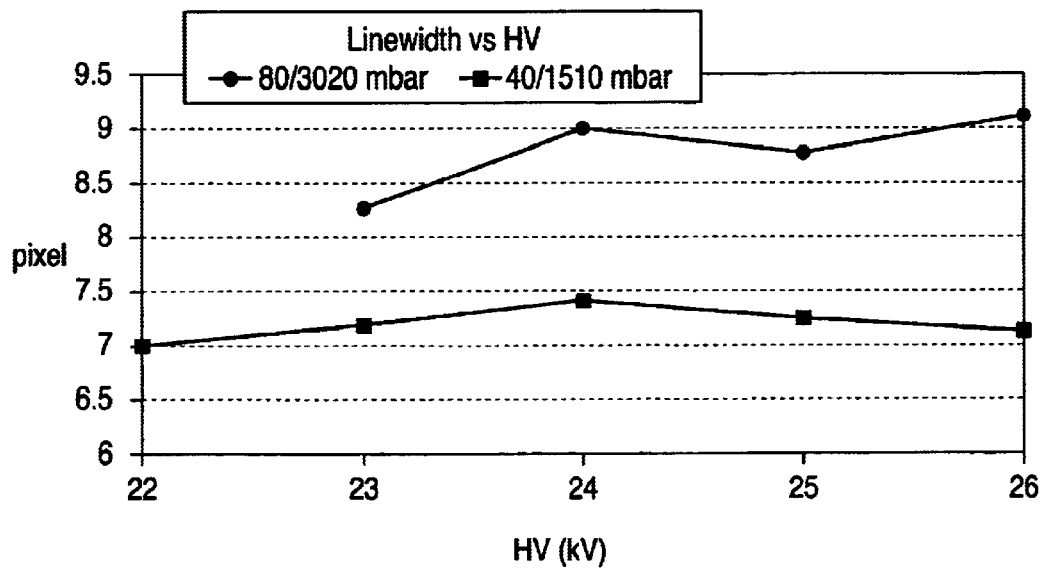
FIG. 7 shows that there is no appreciable dependence of the bandwidth on the input operating high voltage to the laser discharge electrodes.

FIG. 7 shows plots of linewidth or bandwidth of the selected $F_2$ laser emission line at 3020 mbar total pressure, 80 mbar $F_2$ 5% in Ne and at 1510 mbar total pressure, 40 mbar $F_2$ 5% in Ne. The bandwidth is shown measured in pixels on the CCD array, which is proportional to the bandwidth in pm as described above with reference to FIG. 4. FIG. 7 shows that the bandwidth is significantly reduced at 1510 mbar total pressure as opposed to 3020 total pressure, but there is no appreciable dependence of the bandwidth on the input operating high voltage to the laser discharge electrodes. It is known that the output energy of laser pulses will be increased as the driving voltage (HV) is increased. The reduction in pulse energy incurred when the total pressure is reduced to, e.g., 1510 mbar, may be compensated according to a preferred embodiment by increasing the driving voltage to a higher level. The pulser and power supply circuit described above would be modified to deliver the extra power.

Figures 8, 9, 10:
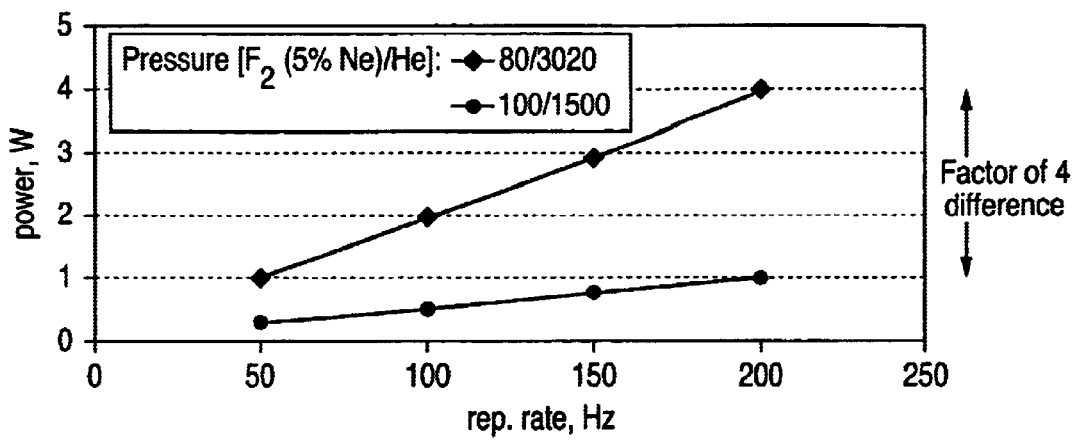
FIG. 8 shows output power of a $F_2$ laser beam as a function of the repetition rate for the pulsed discharge.
FIG. 9 shows the dependence of the bandwidth of an $F_2$ laser natural emission on the partial pressure of $F_2$ in the gas mixture and the total pressure of the gas mixture.
FIG. 10 shows bandwidth dependences of natural emissions of the $F_2$ laser on the gas composition, wherein the amount of Ne in the mixture was varied and the total pressure was varied.

FIG. 8 shows graphs of output power of a $F_2$ laser beam as a function of the repetition rate of the pulsed discharge when the laser gas mixture is at 1500 mbar and at 3020 mbar. FIG. 8 shows that the output power at 200 Hz with a gas mixture of 80 mbar $F_2$ (5% in Ne):2940 mbar He is four times greater than with a gas mixture of 100 mbar $F_2$ (5% in Ne):1400 mbar He, whereas at 50 Hz there is a smaller difference in power. However, the difference appears to be about four times at each of 50 Hz, 100 Hz, 150 Hz and 200 Hz. At higher repetition rates such as 1–2 kHz or more, this difference of four times would result in an even higher power difference.

As mentioned above, some or all of this reduced power may be compensated by increasing the driving voltage, even if it entails modifying the discharge circuit. Alternatively, or in combination with increasing the high voltage, the overall $F_2$ laser system may include an amplifier after the oscillator in accord with a preferred embodiment. The amplifier itself may be a discharge tube filed with a gas mixture of, e.g., 1400–3400 mbar He buffer mixed with 100 mbar $F_2$ (5% in Ne). In another embodiment, the electrodes 103 of the system shown in FIGS. 1 and 2 may be lengthened, e.g., to be greater than 28 inches long, such as 30–40 inches or longer, as described in U.S. patent application Ser. No. 09/791,430, which is assigned to the same assignee as the present application and is hereby incorporated by reference. The reflectivity of the partially reflecting outcoupling mirror may be increased in another embodiment, and a combination of these and/or other ways of increasing the pulse energy may be used to bring the energy up to a desired energy, e.g., around 10 mJ, while the bandwidth is advantageously around 0.5 pm or less due to the low total pressure and/or intracavity line-narrowing optics of the $F_2$ laser.

FIG. 9 shows the dependence of the bandwidth of the selected line of an $F_2$ laser natural emission on the partial pressure of $F_2$ in the gas mixture and the total pressure of the gas mixture. The bandwidths at 1500 mbar total pressure are clearly lower than those at each of 2500 mbar, 3000 mbar and 4000 mbar. For example, at 1500 mbar total pressure, the bandwidth is around 6.7 to 7 pixels (0.55 pm to 0.58 pm), while the bandwidth at 4000 mbar total pressure is around 9 to 9.9 pixels (0.74 pm to 0.81 pm). FIG. 9 also shows that there is little dependence of the bandwidth on the $F_2$ partial pressure, while the high dependence of the bandwidth on the total pressure of the gas mixture is clearly observed.

FIG. 10 shows bandwidths of natural emissions of the $F_2$ laser on the gas composition, wherein the amount of Ne in the mixture was varied and the total pressure was varied. FIG. 10 shows little or no dependence of the bandwidth on the Ne partial pressure and a high dependence on the total pressure, as has been observed in earlier FIGS. 4 and 9 and described above. FIG. 11 lists related references which are hereby incorporated by reference and a table of bandwidths measured by the authors of these references.

The dependence of the bandwidth on the buffer gas or total gas pressure in the molecular fluorine laser tube has been shown, and described above with particular reference to FIGS. 4, 9 and 10, to advantageously decrease with decreased buffer gas in the gas mixture. Thus, the partial pressure of the buffer gas in the laser tube may be adjusted to adjust the bandwidth of the laser emission. In a preferred embodiment, the buffer gas pressure is maintained below ordinary total pressures in excimer laser tubes, which are maintained, e.g., at 3 bar to 5 bar. as described above, a reduction in total pressure of around 1 bar reduces the bandwidth by around 0.1 pm.

Variations of gas compositions and supply techniques are described at U.S. Pat. Nos. 4,393,405, 4,977,573 and 6,157,662 and U.S. patent application Ser. Nos. 09/513,025, 09/447,882 and 09/418,052, each of which is assigned to the same assignee and is hereby incorporated by reference into the present application. The concentration of the fluorine in the gas mixture may range from 0.05 mbar to 30 mbar, and is preferably around 3 mbar. Halogen and rare gas injections, total pressure adjustments and gas replacement procedures are performed using the gas handling module 106 (see FIGS. 1–2) preferably including a vacuum pump 128, a valve network and one or more gas compartments 126. The gas handling module 106 receives gas via gas lines connected to gas containers, tanks, canisters and/or bottles. Preferred gas handling and/or replenishment procedures of the preferred embodiment, other than as specifically described herein, are described at U.S. Pat. Nos. 4,977,573, 6,212,214 and 5,396,514 and U.S. patent application Ser. Nos. 09/447,882, 09/418,052, 09/734,459, and 09/513,025, each of which is assigned to the same assignee as the present application, and U.S. Pat. Nos. 5,978,406, 6,014,398 and 6,028,880, all of which are hereby incorporated by reference. A rare gas supply may be included either internal or external to the laser system according to the '025 application, mentioned above, for adding trace amounts of a rare gas or rare gases for boosting the energy or more preferably for boosting the energy stability and/or overshoot control of the laser.

As discussed, preferably there are no line-narrowing optics in the resonator that are subject to degradation, wherein alternatively, only optics to select a single line (i.e., $\lambda_1$) may be used. However, line-narrowing optics may be used for further line-narrowing in combination with the line-narrowing and/or bandwidth adjustment that is performed by adjusting/reducing the total pressure in the laser chamber. For example, a natural bandwidth may be adjusted to 0.5 pm by reducing the buffer gas partial pressure to 1000–1500 mbar. The bandwidth could then be further reduced to 0.2 pm or below using line-narrowing optics either in the resonator or external to the resonator. Thus, a general description of the line-narrowing optics that may be used are provided above.

In all of the above and below embodiments, the material used for the prisms, either dispersive or of a beam expander, any etalons or other interferometric devices, laser windows and the outcoupler, is preferably a material that is highly transparent at wavelengths below 200 nm, such as at the 157 nm output emission wavelength of the molecular fluorine laser. The material is also capable of withstanding long-term exposure to ultraviolet light with minimal degradation effects. Examples of such materials are $CaF_2$, $MgF_2$, $BaF2$, LiF and $SrF_2$, wherein $CaF_2$ is generally preferred, and in some cases quartz or fluorine-doped quartz may be used. Also, in any of the embodiments, optical surfaces, particularly those of the prisms, may have an anti-reflective coating on one or more optical surfaces, in order to minimize reflection losses and prolong their lifetime.

A line-narrowed oscillator, e.g., a set forth above, may be followed by a power amplifier for increasing the power of the beam output by the oscillator. Preferred features of the oscillator-amplifier set-up are set forth at U.S. patent application Ser. Nos. 09,1599,130 and 60/228,184, which are assigned to the same assignee and are hereby incorporated by reference. The amplifier may be the same or a separate discharge chamber 102 (see FIGS. 1–2). An optical or electrical delay may be used to time the electrical discharge at the amplifier with the reaching of the optical pulse from the oscillator at the amplifier. With particular respect to the preferred embodiments herein, the molecular fluorine laser oscillator has an advantageous total gas pressure, or gas composition, that produces a very narrow band emission at $\lambda_1$ without optics that would otherwise be used for achieving such a very narrow bandwidth, e.g., less than 0.5 pm. A 157 nm beam is output from the output coupler and is incident at the amplifier of this embodiment to increase the power of the beam. Thus, a very narrow bandwidth beam (e.g., less than 0.5 pm) is achieved with high power (at least several Watts to more than 10 Watts), and such that 10 mJ, less than 0.6 pm, 157 nm laser pulses are achieved, and without sophisticated very narrow bandwidth line-narrowing optics, or with such optics for having a laser pulses with bandwidths of 0.2 pm or less.

While exemplary drawings and specific embodiments of the present invention have been described and illustrated, it is to be understood that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, the operations have been ordered in selected typographical sequences. However, the sequences have been selected and so ordered for typographical convenience and are not intended to imply any particular order for performing the operations, except for those claims wherein a particular ordering of steps is expressly set forth or understood by one of ordinary skill in the art as being necessary.

What is claimed is:

1. A molecular fluorine laser system, comprising:
   a discharge tube filled with a gas mixture including consisting essentially of molecular fluorine and at least one buffer gas and having a total pressure of less than substantially 2500 mbar;
   a plurality of electrodes within the discharge tube;
   a pulsed discharge circuit connected to the electrodes for energizing the gas mixture;
   a line-selection optic for selecting one of multiple closely-spaced lines around 157 nm emitted from the discharge tube; and
   a laser resonator including the line-selection optic and the discharge tube for generating a beam of laser pulses having a wavelength around 157 nm at a bandwidth of less than 0.6 pm.; and means for controlling the bandwidth of the laser beam by controlling the pressure within the discharge tube.

2. The laser system of claim 1, wherein the pulsed discharge circuit includes a power supply for supplying voltage pulses of at least 22 kV, such that the laser pulses have a desired energy for photolithographic processing.

3. The laser system of claim 2, wherein the laser pulses have energies of at least substantially 10 mJ.

4. A molecular fluorine laser system, comprising:
 a discharge tube filled with a gas mixture including consisting essentially of molecular fluorine and at least one buffer gas and having a total pressure of less than 2000 mbar;
 a plurality of electrodes within the discharge tube;
 a pulsed discharge circuit connected to the electrodes for energizing the gas mixture;
 a line-selection optic for selecting one of multiple closely-spaced lines around 157 nm emitted from the discharge tube; and
 a laser resonator including the line-selection optic and the discharge tube for generating a laser beam having a wavelength around 157 nm at a bandwidth of less than 0.6 pm.; and
 means for controlling the bandwidth of the laser beam by controlling the pressure within the discharge tube.

5. The laser system of claim 4, wherein the pulsed discharge circuit includes a power supply for supplying voltage pulses of at least 22 kV, such that the laser pulses have a desired energy for photolithographic processing.

6. The laser system of claim 5, wherein the laser pulses have energies of at least substantially 10 mJ.

7. A molecular fluorine laser system, comprising:
 a discharge tube filled with a gas mixture including consisting essentially of molecular fluorine and at least one buffer gas and having a total pressure of less than substantially 1500 mbar;
 a plurality of electrodes within the discharge tube;
 a pulsed discharge circuit connected to the electrodes for energizing the gas mixture;
 a line-selection optic for selecting one of multiple closely-spaced lines around 157 nm emitted from the discharge tube; and
 a laser resonator including the line-selection optic and the discharge tube for generating a laser beam having a wavelength around 157 nm at a bandwidth of less than 0.6 pm.; and
 means for controlling the bandwidth of the laser beam by controlling the pressure within the discharge tube.

8. The laser system of claim 7, wherein the pulsed discharge circuit includes a power supply for supplying voltage pulses of at least 22 kV, such that the laser pulses have a desired energy for photolithographic processing.

9. The laser system of claim 8, wherein the laser pulses have energies of at least substantially 10 mJ.

10. A molecular fluorine laser system, comprising:
 a discharge tube filled with a gas mixture including consisting essentially of molecular fluorine and at least one buffer gas and having a total pressure of less than substantially 1000 mbar;
 a plurality of electrodes within the discharge tube;
 a pulsed discharge circuit connected to the electrodes for energizing the gas mixture;
 a line-selection optic for selecting one of multiple closely-spaced lines around 157 nm emitted from the discharge tube; and
 a laser resonator including the line-selection optic and the discharge tube for generating a laser beam having a wavelength around 157 nm at a bandwidth of less than 0.6 pm.; and
 means for controlling the bandwidth of the laser beam by controlling the pressure within the discharge tube.

11. The laser system of claim 10, wherein the pulsed discharge circuit includes a power supply for supplying voltage pulses of at least 22 kV, such that the laser pulses have a desired energy for photolithographic processing.

12. The laser system of claim 11, wherein the laser pulses have energies of at least substantially 10 mJ.

13. A molecular fluorine laser system, comprising:
 a discharge tube filled with a gas mixture including consisting essentially of molecular fluorine and at least one buffer gas and having a total pressure of less than substantially 2500 mbar;
 a plurality of electrodes within the discharge tube;
 a pulsed discharge circuit connected to the electrodes for energizing the gas mixture;
 a line-narrowing module for selecting one of multiple closely-spaced lines around 157 nm emitted from the discharge tube, and for optically narrowing the bandwidth of the selected line; and
 a laser resonator including the line-narrowing module and the discharge tube for generating a beam of laser pulses having a wavelength around 157 nm at a bandwidth of less than 0.5 pm.; and
 means for controlling the bandwidth of the laser beam by controlling the pressure within the discharge tube.

14. The laser system of claim 13, further comprising an amplifier for boosting the energies of the laser pulses to desired energies for photolithographic processing.

15. The laser system of claim 14, wherein said laser pulses have energies of at least substantially 10 mJ.

16. A molecular fluorine laser system, comprising:
 a discharge tube filled with a gas mixture including consisting essentially of molecular fluorine and at least one buffer gas and having a total pressure of less than 2000 mbar;
 a plurality of electrodes within the discharge tube;
 a pulsed discharge circuit connected to the electrodes for energizing the gas mixture;
 a line-narrowing module for selecting one of multiple closely-spaced lines around 157 nm emitted from the discharge tube, and for optically narrowing the bandwidth of the selected line; and
 a laser resonator including the line-narrowing module and the discharge tube for generating a beam of laser pulses having a wavelength around 157 nm at a bandwidth of less than 0.5 pm.; and
 means for controlling the bandwidth of the laser beam by controlling the pressure within the discharge tube.

17. The laser system of claim 16, further comprising an amplifier for boosting the energies of the laser pulses to desired energies for photolithographic processing.

18. The laser system of claim 17, wherein said laser pulses have energies of at least substantially 10 mJ.

19. A molecular fluorine laser system, comprising:
 a discharge tube filled with a gas mixture including consisting essentially of molecular fluorine and at least one buffer gas and having a total pressure of less than substantially 1500 mbar;

a plurality of electrodes within the discharge tube;

a pulsed discharge circuit connected to the electrodes for energizing the gas mixture;

a line-narrowing module for selecting one of multiple closely-spaced lines around 157 nm emitted from the discharge tube, and for optically narrowing the bandwidth of the selected line; and a laser resonator including the line-narrowing module and the discharge tube for generating a beam of laser pulses having a wavelength around 157 nm at a bandwidth of less than 0.5 pm.; and means for controlling the bandwidth of the laser beam by controlling the pressure within the discharge tube.

20. The laser system of claim 19, further comprising an amplifier for boosting the energies of the laser pulses to desired energies for photolithographic processing.

21. The laser system of claim 20, wherein said laser pulses have energies of at least substantially 10 mJ.

22. A molecular fluorine laser system, comprising:

a discharge tube filled with a gas mixture including consisting essentially of molecular fluorine and at least one buffer gas and having a total pressure of less than substantially 1000 mbar;

a plurality of electrodes within the discharge tube;

a pulsed discharge circuit connected to the electrodes for energizing the gas mixture;

a line-narrowing module for selecting one of multiple closely-spaced lines around 157 nm emitted from the discharge tube, and for optically narrowing the bandwidth of the selected line; and a laser resonator including the line-narrowing module and the discharge tube for generating a beam of laser pulses having a wavelength around 157 nm at a bandwidth of less than 0.5 pm.; and means for controlling the bandwidth of the laser beam by controlling the pressure within the discharge tube.

23. The laser system of claim 22, further comprising an amplifier for boosting the energies of the laser pulses to desired energies for photolithographic processing.

24. The laser system of claim 23, wherein said laser pulses have energies of at least substantially 10 mJ.

25. A molecular fluorine laser system, comprising:

a discharge tube filled with a gas mixture including consisting essentially of molecular fluorine and at least one buffer gas and having a total pressure of less than substantially 2500 mbar;

a plurality of electrodes within the discharge tube;

a pulsed discharge circuit connected to the electrodes for energizing the gas mixture;

a line-selection optic for selecting one of multiple closely-spaced lines around 157 nm emitted from the discharge tube;

a laser resonator including the line-selection optic and the discharge tube for generating a beam of laser pulses having a wavelength around 157 nm at a bandwidth of less than 0.6 pm; and an amplifier for boosting the energies of the laser pulses to desired energies for photolithographic processing; and means for controlling the bandwidth of the laser beam by controlling the pressure within the discharge tube.

26. The laser system of claim 23, wherein said laser pulses have energies of at least substantially 10 mJ.

27. A molecular fluorine laser system, comprising:

a discharge tube filled with a gas mixture including consisting essentially of molecular fluorine and at least one buffer gas and having a total pressure of less than substantially 2000 mbar;

a plurality of electrodes within the discharge tube;

a pulsed discharge circuit connected to the electrodes for energizing the gas mixture;

a line-selection optic for selecting one of multiple closely-spaced lines around 157 nm emitted from the discharge tube;

a laser resonator including the line-selection optic and the discharge tube for generating a beam of laser pulses having a wavelength around 157 nm at a bandwidth of less than 0.6 pm; and an amplifier for boosting the energies of the laser pulses to desired energies for photolithographic processing; and means for controlling the bandwidth of the laser beam by controlling the pressure within the discharge tube.

28. The laser system of claim 27, wherein said laser pulses have energies of at least substantially 10 mJ.

29. A molecular fluorine laser system, comprising:

a discharge tube filled with a gas mixture including consisting essentially of molecular fluorine and at least one buffer gas and having a total pressure of less than substantially 1500 mbar;

a plurality of electrodes within the discharge tube;

a pulsed discharge circuit connected to the electrodes for energizing the gas mixture;

a line-selection optic for selecting one of multiple closely-spaced lines around 157 nm emitted from the discharge tube;

a laser resonator including the line-selection optic and the discharge tube for generating a beam of laser pulses having a wavelength around 157 nm at a bandwidth of less than 0.6 pm; and an amplifier for boosting the energies of the laser pulses to desired energies for photolithographic processing; and means for controlling the bandwidth of the laser beam by controlling the pressure within the discharge tube.

30. The laser system of claim 29, wherein said laser pulses have energies of at least substantially 10 mJ.

31. A molecular fluorine laser system, comprising:

a discharge tube filled with a gas mixture including consisting essentially of molecular fluorine and at least one buffer gas and having a total pressure of less than substantially 1000 mbar;

a plurality of electrodes within the discharge tube;

a pulsed discharge circuit connected to the electrodes for energizing the gas mixture;

a line-selection optic for selecting one of multiple closely-spaced lines around 157 nm emitted from the discharge tube;

a laser resonator including the line-selection optic and the discharge tube for generating a beam of laser pulses having a wavelength around 157 nm at a bandwidth of less than 0.6 pm; and an amplifier for boosting the energies of the laser pulses to desired energies for photolithographic processing; and means for controlling the bandwidth of the laser beam by controlling the pressure within the discharge tube.

32. The laser system of claim 23, wherein said laser pulses have energies of at least substantially 10 mJ.

33. A molecular fluorine laser system, comprising:

a discharge tube filled with a gas mixture including consisting essentially of molecular fluorine and at least one buffer gas;

a plurality of electrodes within the discharge tube;

a pulsed discharge circuit connected to the electrodes for energizing the gas mixture;

a line-selection optic for selecting one of multiple closely-spaced lines around 157 nm emitted from the discharge tube;

a laser resonator including the line-selection optic and the discharge tube for generating a beam of laser pulses having a wavelength around 157 nm at a bandwidth of less than 0.6 pm;

a diagnostic module for measuring spectral information of the laser pulses;

a processor for receiving diagnostic signals containing the spectral information from the diagnostic module; and a gas handling unit for receiving instruction signals from the processor and for adjusting the gas mixture based on information contained in said instruction signals.

34. The laser system of claim 33, wherein the pulsed discharge circuit includes a power supply for supplying voltage pulses of at least 22 kV, such that the laser pulses have a desired energy for photolithographic processing.

35. The laser system of claim 34, wherein the laser pulses have energies of at least substantially 10 mJ.

36. The laser system of claim 33, further comprising an amplifier for boosting the energies of the laser pulses to desired energies for photolithographic processing.

37. The laser system of claim 34, wherein the laser pulses have energies of at least substantially 10 mJ.

38. A molecular fluorine laser system, comprising:

a discharge tube filled with a gas mixture including consisting essentially of molecular fluorine and at least one buffer gas and having a total pressure of less than substantially 2500 mbar;

a plurality of electrodes within the discharge tube;

a pulsed discharge circuit connected to the electrodes for energizing the gas mixture;

a line-selection optic for selecting one of multiple closely-spaced lines around 157 nm emitted from the discharge tube;

a laser resonator including the line-selection optic and the discharge tube for generating a beam of laser pulses having a wavelength around 157 nm at a bandwidth of less than 0.6 pm;

a diagnostic module for measuring the bandwidth of the laser pulses;

a processor for receiving diagnostic signals containing bandwidth information from the diagnostic module; and a gas handling unit for receiving instruction signals from the processor and for adjusting the total pressure of the gas mixture based on information contained in said instruction signals to control the bandwidth of the laser pulses.

39. The laser system of claim 38, wherein the pulsed discharge circuit includes a power supply for supplying voltage pulses of at least 22 kV, such that the laser pulses have a desired energy for photolithographic processing.

40. The laser system of claim 39, wherein the laser pulses have energies of at least substantially 10 mJ.

41. The laser system of claim 38, further comprising an amplifier for boosting the energies of the laser pulses to desired energies for photolithographic processing.

42. The laser system of claim 34, wherein the laser pulses have energies of at least substantially 10 mJ.

* * * * *